US010160909B2

(12) United States Patent
Klasen-Memmer et al.

(10) Patent No.: US 10,160,909 B2
(45) Date of Patent: *Dec. 25, 2018

(54) LIQUID CRYSTALLINE MEDIUM

(71) Applicant: Merck Patent GmbH, Darmstadt (DE)

(72) Inventors: Melanie Klasen-Memmer, Heuchelheim (DE); Sabine Schoen, Herten (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,718

(22) Filed: Nov. 8, 2016

(65) Prior Publication Data

US 2017/0051204 A1    Feb. 23, 2017

Related U.S. Application Data

(62) Division of application No. 14/921,603, filed on Oct. 23, 2015, which is a division of application No. 14/706,463, filed on May 7, 2015, now Pat. No. 9,701,903, which is a division of application No. 13/968,864, filed on Aug. 16, 2013, which is a division of application No. 13/524,352, filed on Jun. 15, 2012, now Pat. No. 9,267,078, which is a division of application No. 13/170,513, filed on Jun. 28, 2011, now Pat. No. 9,340,730, which is a division of application No. 11/631,182, filed as application No. PCT/EP2005/007128 on Jul. 1, 2005, now Pat. No. 7,989,035.

(30) Foreign Application Priority Data

Jul. 2, 2004   (DE) .................. 10 2004 032 326

(51) Int. Cl.
| | |
|---|---|
| *G02F 1/1333* | (2006.01) |
| *C09K 19/30* | (2006.01) |
| *C09K 19/02* | (2006.01) |
| *C09K 19/12* | (2006.01) |
| *C09K 19/44* | (2006.01) |
| *C09K 19/18* | (2006.01) |
| *C09K 19/04* | (2006.01) |

(52) U.S. Cl.
CPC .......... *C09K 19/3001* (2013.01); *C09K 19/02* (2013.01); *C09K 19/0208* (2013.01); *C09K 19/0216* (2013.01); *C09K 19/12* (2013.01); *C09K 19/3003* (2013.01); *C09K 19/3028* (2013.01); *C09K 19/3048* (2013.01); *C09K 19/3066* (2013.01); *C09K 19/3068* (2013.01); *C09K 19/3098* (2013.01); *C09K 19/44* (2013.01); *C09K 2019/0466* (2013.01); *C09K 2019/122* (2013.01); *C09K 2019/123* (2013.01); *C09K 2019/181* (2013.01); *C09K 2019/183* (2013.01); *C09K 2019/301* (2013.01); *C09K 2019/303* (2013.01); *C09K 2019/3004* (2013.01); *C09K 2019/304* (2013.01); *C09K 2019/305* (2013.01); *C09K 2019/3009* (2013.01); *C09K 2019/3016* (2013.01); *C09K 2019/3021* (2013.01); *C09K 2019/3027* (2013.01)

(58) Field of Classification Search
CPC ................ C09K 19/3001; C09K 19/02; C09K 19/0208; C09K 19/12; C09K 19/3003; C09K 19/3028; C09K 19/3048; C09K 19/3066; C09K 19/3068; C09K 19/3098; C09K 19/44; C09K 19/0216; G02F 1/1333
USPC .................................... 252/299.66
See application file for complete search history.

(56) References Cited

U.S. PATENT DOCUMENTS

| | | | |
|---|---|---|---|
| 4,917,472 | A | 4/1990 | Margerum et al. |
| 5,543,075 | A | 8/1996 | Parri et al. |
| 5,599,480 | A | 2/1997 | Tarumi et al. |
| 6,066,268 | A | 5/2000 | Ichinose et al. |
| 6,190,576 | B1 | 2/2001 | Andou et al. |
| 6,210,761 | B1 | 4/2001 | Kondo et al. |
| 6,217,953 | B1 | 4/2001 | Heckmeier et al. |
| 6,319,570 | B1 | 11/2001 | Andou et al. |
| 6,458,433 | B1 | 10/2002 | Kato et al. |
| 6,558,758 | B1 | 5/2003 | Yanai et al. |
| 6,642,981 | B1 | 11/2003 | Ohmuro et al. |
| 6,692,657 | B1 | 2/2004 | Kato et al. |

(Continued)

FOREIGN PATENT DOCUMENTS

| | | |
|---|---|---|
| DE | 100 50 071 A1 | 6/2001 |
| DE | 10112955 A1 | 11/2001 |

(Continued)

OTHER PUBLICATIONS

English Abstract of JP 2002193852 (A)—Merck Patent GmbH, "Alkenyl Compound With Negative Dielectric Constant Anisotropy and Liquid Crystalline Medium", Jul. 10, 2002.
Notice of Opposition dated Nov. 22, 2012—Re: European Patent EP 2 199 363 B1, European Patent Application No. 10 003 550.0, Merck Patent GmbH—Opponent: DIC Corporation.
Notice of Opposition dated May 29, 2013—Re: European Patent EP 2 208 773 B1, European Patent Application No. 10 004 670.5, Merck Patent GmbH—Opponent: DIC Corporation.
Notice of Opposition dated May 29, 2013—Re: European Patent EP 2 208 774 B1, European Patent Application No. 10 004 671.3, Merck Patent GmbH—Opponent: DIC Corporation.

(Continued)

*Primary Examiner* — Geraldina Visconti
(74) *Attorney, Agent, or Firm* — Millen White Zelano and Branigan, PC; Csaba Henter

(57) ABSTRACT

The present invention relates to a liquid-crystalline medium based on a mixture of polar compounds having negative dielectric anisotropy ($\Delta\epsilon$), which is distinguished by the fact that it has a value for the ratio $\gamma_1/\Delta n^2$ in the range 6-45 with a clearing point of >60° C. and a $\Delta\epsilon$ of $\leq-2.3$. Media of this type are particularly suitable for electro-optical displays having active-matrix addressing based on the ECB, PA LCD, FFS or IPS effect.

24 Claims, No Drawings

(56) References Cited

U.S. PATENT DOCUMENTS

| | | | |
|---|---|---|---|
| 6,703,083 B2 | 3/2004 | Kato et al. | |
| 6,740,369 B2 | 5/2004 | Klasen-Memmer et al. | |
| 6,764,722 B2 | 7/2004 | Klasen-Memmer et al. | |
| 6,764,723 B2 | 7/2004 | Lee et al. | |
| 6,896,939 B2 | 5/2005 | Klasen-Memmer et al. | |
| 6,929,834 B2 | 8/2005 | Klasen-Memmer et al. | |
| 6,933,022 B2 | 8/2005 | Klasen-Memmer et al. | |
| 7,026,022 B2 | 4/2006 | Klasen-Memmer et al. | |
| 7,371,437 B2 | 5/2008 | Klasen-Memmer et al. | |
| 7,582,337 B2 | 9/2009 | Klasen-Memmer et al. | |
| 7,767,280 B2 | 8/2010 | Klasen-Memmer et al. | |
| 7,785,677 B2 | 8/2010 | Klasen-Memmer et al. | |
| 7,854,970 B2 | 12/2010 | Klasen-Memmer et al. | |
| 7,887,717 B2 | 2/2011 | Kojima et al. | |
| 7,981,487 B2 | 7/2011 | Klasen-Memmer et al. | |
| 7,989,035 B2* | 8/2011 | Klasen-Memmer | C09K 19/02 252/299.63 |
| 8,025,935 B2 | 9/2011 | Klasen-Memmer | |
| 8,277,907 B2* | 10/2012 | Klasen-Memmer | C09K 19/02 252/299.63 |
| 8,361,568 B2 | 1/2013 | Klasen-Memmer et al. | |
| 8,399,073 B2 | 3/2013 | Klasen-Memmer et al. | |
| 8,475,889 B2 | 7/2013 | Klasen-Memmer et al. | |
| 8,808,814 B2 | 8/2014 | Matsumura et al. | |
| 8,968,840 B2* | 3/2015 | Klasen-Memmer | C09K 19/02 252/299.01 |
| 8,999,460 B2 | 4/2015 | Goebel et al. | |
| 9,267,078 B2* | 2/2016 | Klasen-Memmer | C09K 19/02 |
| 9,340,730 B2* | 5/2016 | Klasen-Memmer | C09K 19/02 |
| 9,428,694 B2 | 8/2016 | Engel et al. | |
| 9,567,526 B2 | 2/2017 | Engel et al. | |
| 9,580,653 B2 | 2/2017 | Archetti et al. | |
| 9,594,283 B2 | 3/2017 | Tong et al. | |
| 9,701,903 B2* | 7/2017 | Klasen-Memmer | C09K 19/02 |
| 2001/0010366 A1 | 8/2001 | Heckmeier et al. | |
| 2002/0014613 A1 | 2/2002 | Klasen-Memmer et al. | |
| 2002/0038858 A1 | 4/2002 | Kato et al. | |
| 2002/0084443 A1 | 7/2002 | Heckmeier et al. | |
| 2003/0006399 A1 | 1/2003 | Reuter et al. | |
| 2003/0017279 A1 | 1/2003 | Klasen-Memmer et al. | |
| 2003/0039769 A1 | 2/2003 | Lee et al. | |
| 2003/0071244 A1 | 4/2003 | Klasen-Memmer | |
| 2003/0222245 A1 | 12/2003 | Klasen-Memmer et al. | |
| 2004/0041125 A1 | 3/2004 | Bremer | |
| 2004/0065866 A1 | 4/2004 | Kato et al. | |
| 2004/0099842 A1 | 5/2004 | Klasen-Memmer et al. | |
| 2004/0146662 A1 | 7/2004 | Klasen-Memmer et al. | |
| 2005/0121647 A1 | 6/2005 | Klasen-Memmer et al. | |
| 2006/0124896 A1 | 6/2006 | Klasen-Memmer et al. | |
| 2007/0034830 A1 | 2/2007 | Heckmeier et al. | |
| 2012/0248374 A1 | 10/2012 | Klasen-Memmer et al. | |
| 2016/0046862 A1* | 2/2016 | Klasen-Memmer | C09K 19/02 252/299.63 |
| 2016/0096813 A1 | 4/2016 | Stensrud | |
| 2017/0051204 A1 | 2/2017 | Klasen-Memmer | |
| 2017/0066966 A9* | 3/2017 | Klassen-Memmer | C09K 19/02 |
| 2017/0073580 A1* | 3/2017 | Klasen-Memmer | C09K 19/02 |
| 2017/0267928 A1* | 9/2017 | Klasen-Memmer | C09K 19/02 |

FOREIGN PATENT DOCUMENTS

| | | |
|---|---|---|
| DE | 10157670 | 6/2002 |
| DE | 10218976 A1 | 12/2002 |
| EP | 0916639 A1 | 5/1999 |
| EP | 0945418 A1 | 9/1999 |
| EP | 0949232 A1 | 10/1999 |
| EP | 0969071 A1 | 1/2000 |
| EP | 1026142 A1 | 8/2000 |
| EP | 1146104 | 10/2001 |
| EP | 1251160 | 10/2002 |
| EP | 1352943 A1 | 10/2003 |
| EP | 1369406 A1 | 12/2003 |
| JP | H09-208503 A | 8/1997 |
| JP | H09-291282 A | 11/1997 |
| JP | 9328443 | 12/1997 |
| JP | 10287875 | 10/1998 |
| JP | 11140447 | 5/1999 |
| JP | 2000038585 | 2/2000 |
| JP | 2000336364 A | 12/2000 |
| JP | 2001-34197 A | 2/2001 |
| JP | 2001354967 | 12/2001 |
| JP | 2002156619 A | 5/2002 |
| JP | 2002193852 A | 7/2002 |
| JP | 2002193853 | 7/2002 |
| JP | 2003013065 | 1/2003 |
| JP | 2003119466 | 4/2003 |
| JP | 2003327965 | 11/2003 |
| JP | 2004-035698 A | 2/2004 |
| JP | 2004-043461 A | 2/2004 |
| JP | 2004532344 | 10/2004 |
| JP | 2006507387 | 3/2006 |
| TW | 201716556 A | 5/2017 |
| WO | 9408268 | 4/1994 |
| WO | 9736847 | 10/1997 |
| WO | 9823563 | 6/1998 |
| WO | 9827036 | 6/1998 |
| WO | 9921815 | 5/1999 |
| WO | 02/051963 A1 | 7/2002 |
| WO | 2002099010 | 12/2002 |
| WO | 2004048500 | 6/2004 |
| WO | 2004104137 | 12/2004 |

OTHER PUBLICATIONS

Ogawa Shinji et al., "Liquid Crystal Composition and Liquid Crystal Display Device", Publication No. 2000-336364, Date of Publication of Application: May 12, 2000—Abstract and English Translation of JP 2000-336364 A.

English Abstract and English Translation of JP 9-328443 published on Dec. 22, 1997.

English Abstract of EP 1352943 (A1)—Oct. 15, 2003—Klassen-Memmer et al., "Liquid crystalline medium and electrooptical display containing it".

English Abstract of JP 10287875(A)—Oct. 27, 1998—Chisso Corp., "Liquid Crystal Composition and Liquid Crystal Display Element".

English Abstract of JP 2002193853—Jul. 10, 2002—Merck Patent GmbH, "Tetracyclic Compound With Negative Dielectric Constant Anisotropy and Liquid Crystalline Medium".

CAPLUS 1997: 732413.

English Machine translation of JP9291282 Abstract published Nov. 11, 1997 to Tsubata Yoshiaki of Sumitomo Chemical Co.

English Machine translation of JP9208503 Abstract published Aug. 12, 1997 to Dainippon Ink & Chemicals.

Comparative test 1: (paper numbered D18 in EP opposition 2199363) dated Aug. 14, 2015.

Comparative test 2: (paper numbered D19 in EP opposition 2199363) dated Aug. 14, 2015.

M. Junge,The Merck Group Liquid Crystal Newsletter No. 11, Apr. 1995—published by E. Merck—Physical Properties of Liquid Crystals: IX. Rotational Viscosity of Nematic Liquid Crystal Materials, pp. 1-16.

P. Kirsch; Agnew Chem 2000-112, pp. 4384-4405, Nematische Flussigkristalle fur Aktiv-Matrix-Displays: Design und Synthese.

Schadt, Martin—Ber. Bunsenges. Phys. Chem, 97, 1213-1236 (1993) No. 10 , Liquid Crystals in Information Technology.

Yamamoto, H; 2002 Chisso Korea Seminar—The introduction of the new "LIQUID CRYSTAL materials" and "ALIGNMENT materials" for TFT-LCDs, May 2002.

Pauluth, Detlef et al., The Royal Society of Chemistry 2004; 14, 1219-1227, Advanced liquid crystals for television.

Further Submission in EP 2 199 363 Opposition Proc. dated Sep. 2, 2014.

U. Finkenzeller; Kontakte (E-Merck)—ISSN 0172-8712 1988 (2)— pp. 7-14, Physical Properties of Liquid Crystals.

M. Junge; Merck Liquid Crystals (LicristalR)—Physical Properties of Liquid Crystals IX Nov. 1997; pp. 1-16.

(56) References Cited

OTHER PUBLICATIONS

Schadt, M.; Displays vol. 13, No. 1, 1992 pp. 11-33 Field-effect liquid crystal displays a liquid crystal materials: key technologies of the 1990's.
Communication dated Apr. 30, 2015 from EP 2 199 363 opposition.
English machine translation of JP 2002-193852.
Communication dated May 26, 2015 from EP 2 199 363 opposition (Annex I), enclosing the Communication dated May 2, 2001 from EP 2 199 363 opposition (Annex II).
NPL D16 citation from EP 2 208 773 opposition submitted Jan. 16, 2014, pp. 1-13, Examples 3, 6 & 9 from DE 10218876.
1995 International Workshop on Active Matrix Liquid-Crystal Displays, Aug. 24, 1995 AM-LCD 95 Digest of Technical Papers—A74 pp. 105 (Development of New LC Materials with Negative Dielectric Aniosotropy for AM-LCD Application).
Paper from EP 2 199 363 dated Jun. 7, 2015 pp. 1-2 (Notes re: oral proceedings).
English Translation of JP 2001-34197, Feb. 9, 2001.
Experimental Testing Reports from EP 2 208 773 opposition (25591 CB/WE) submitted Sep. 10, 2014, titled "Liquid-crystalline medium".
Experimental Test Report from EP 2 199 363 opposition (D18a) submitted Apr. 30, 2015—Expermiental Test Results Examples, pp. 1-4.
Experimental Test Report from EP 2 199 363 opposition (D18b) submitted Apr. 30, 2015—Expermiental Test Results Examples, pp. 1-2.
Schad; J. Appl. Phys. 54(9) Sep. 1983 "The Rotational Viscosity of Nematic LC Mixtures" (D12).
Reply of patent proprietor dated Jan. 15, 2014 in EP 2 208 773 opposition.
Kulicke; Fliessverhalten von Stoffen und Stoffgemischen (E. Merck) 1986 (ISBN 3-85739-115-4) pp. 318-368 (D9).
Noel, C; Pure Appl. Chem. vol. 73, No. 5, pp. 845-895, 2001 (D8).
Becker editor of Merck Liquid Crystals No. 1997, IX Rotational Viscosity, pp. 1-16 (Junge, M)—(10b).
Submission prior to oral proceedings filed in EP 2 199 363 opposition filed online May 28, 2015.
English Translation of U. Finkenzeller; Kontakte (E-Merck)—ISSN 0172-8712 1988 (2)—pp. 7-14, Physical Properties of Liquid Crystals.
English Translation of Kulicke; Fliessverhalten von Stoffen und Stoffgemischen (E. Merck) 1986 (ISBN 3-85739-115-4) pp. 318-368 (D9).
English Translation of P. Kirsch; Agnew Chem 2000-112, pp. 4385-4405, Nematische Flussigkristalle fur Aktiv-Matrix-Displays: Design und Synthese (D11).
English Translation of NPL (D16) citation from EP 2 208 773 opposition submitted Jan. 16, 2014, pp. 1-3, Examples 3, 6 & 9 from DE 10218876.
English Translation of Reply of the patent proprietor dated Jan. 15, 2014 in EP 2 208 773 opposition.
Submissions Prior to Oral Proceedings in EP 2 208 774 filed online on Aug. 13, 2015.
Further Submissions in Opposition Proceedings dated Oct. 9, 2014—Regarding EP 2 208 773, Merck Patent GmbH.
Submissions prior to oral proceedings dated May 27, 2015 (filed on line)—Regarding EP 2 199 363, Merck Patent GmbH.
Request of Proprietor: (paper numbered D23 in EP opposition 2199363) dated Dec. 23, 2015.
Submission prior to oral proceedings filed in EP 2 199 363 opposition dated Dec. 23, 2015.
Experimental test report: (paper numbered D23b in EP opposition 2199363) dated Dec. 23, 2015.
Formula 68 at para [0222] of JP2001-34197: (paper numbered D23a in EP opposition 2199363) dated Dec. 23, 2015.
Machine translation of JPH09-208503 published Aug. 12, 1997 (24a in EP opposition 2199363).
Partial machine translation of JPH09-208503 published Aug. 12, 1997 (24b in EP opposition 2199363).
Experimental Testing Reports from EP 2 199 363 opposition (24205 TA/sg) dated Nov. 9, 2012, titled "Liquid-crystalline medium".
Office Action dated Dec. 23, 2016 in co-pending U.S. Appl. No. 14/706,463 to Klasen-Memmer et al.
Office Action in corresponding JP application 2016-241608 dated Feb. 27, 2018.
Office Action in corresponding JP application 2016-241607 dated Feb. 27, 2018.
Office Action in corresponding JP application 2016-241606 dated Feb. 27, 2018.
Office Action in corresponding TW application 101124058 dated Feb. 22, 2018.
Office Action in co-pending U.S. Appl. No. 15/345,655 dated Nov. 17, 2017.
Opposition No. 2017-700848 in JP6104979 dated Mar. 9, 2018.
Office Action and PTO form 892 in corresponding U.S. Appl. No. 15/608,124 dated Sep. 20, 2018 (pp. 1-13).

* cited by examiner

LIQUID CRYSTALLINE MEDIUM

The present invention relates to a liquid-crystalline medium and to the use thereof in liquid-crystal displays, in particular liquid-crystal displays addressed by means of an active matrix (AMDs or AMLCDs for active matrix addressed liquid crystal displays). Particular preference is given to displays which use an active matrix comprising thin-film transistors (TFTs) or varistors. AMDs of this type can use various active electronic switching elements. The most widespread are displays which use three-pole switching elements. Examples of three-pole switching elements of this type are MOS (metal oxide silicon) transistors or the above-mentioned TFTs or varistors. Various semiconductor materials, predominantly silicon, or also cadmium selenide, are used in the TFTs. In particular, polycrystalline silicon or amorphous silicon is used. In contrast to the three-pole electronic switching elements, matrices of two-pole switching elements, such as, for example, MIM (metal insulator metal) diodes, ring diodes or back-to-back diodes, can also be employed in AMDs.

In liquid-crystal displays of this type, the liquid crystals are used as dielectrics whose optical properties change reversibly on application of an electrical voltage. Electro-optical displays which use liquid crystals as media are known to the person skilled in the art. These liquid-crystal displays use various electro-optical effects.

The most widespread conventional displays use the TN effect (twisted nematic, having a nematic structure twisted by about 90°), the STN effect (supertwisted nematic) or the SBE effect (supertwisted birefringence effect). In these and similar electro-optical effects, liquid-crystalline media having positive dielectric anisotropy ($\Delta\varepsilon$) are used.

In contrast to the said conventional displays, which require liquid-crystal media having positive dielectric anisotropy, there are other electro-optical effects which use liquid-crystal media having negative dielectric anisotropy, such as, for example, the ECB effect (electrically controlled birefringence) and its subforms DAP (deformation of aligned phases), VAN (vertically aligned nematics), MVA (multidomain vertical alignment), ASV (advanced super view), PVA (patterned vertical alignment) and CSH (colour super homeotropics).

The principle of electrically controlled birefringence, the ECB effect (electrically controlled birefringence) or also DAP effect (deformation of aligned phases), was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio of the elastic constants $K_3/K_1$, high values for the optical anisotropy $\Delta n$ and values for the dielectric anisotropy $\Delta\varepsilon$ of −0.5 to −5 in order to be usable for high-information display elements based on the ECB effect. Electro-optical display elements based on the ECB effect have a homeotropic edge alignment.

The IPS effect (in plane switching) increasingly employed recently can use both dielectrically positive and also dielectrically negative liquid-crystal media, similarly to "guest/host" displays, which can employ dyes, depending on the display mode used, either in dielectrically positive or in dielectrically negative media. A further highly promising type of liquid-crystal displays are so-called "axially symmetric microdomain" (ASM for short) displays, which are preferably addressed by means of plasma arrays (PA LCDs from "plasma addressed liquid crystal displays").

The liquid-crystal media employed in the above-mentioned liquid-crystal displays and in all liquid-crystal displays utilising similar effects generally comprise liquid-crystal compounds having the corresponding dielectric anisotropy, i.e. comprising compounds having positive dielectric anisotropy in the case of dielectrically positive media and comprising compounds having negative dielectric anisotropy in the case of dielectrically negative media.

The liquid-crystal media of the prior art generally have relatively low birefringence values, relatively high operating voltages (the threshold voltages ($V_0$) are often relatively high, in some cases greater than 2.3 V) and relatively long response times, which are inadequate, in particular, for video-capable displays. Furthermore, they are usually unsuitable for high operating temperatures and/or have inadequate low-temperature stabilities (LTSs). Thus, for example, the nematic phases often only extend down to −20° C. and in some cases even only down to −10° C.

For the most part, the liquid-crystal media of the prior art have relatively unfavourable values for $\Delta n$, which are often significantly smaller than 0.11 and in some cases smaller than 0.10. However, such small $\Delta n$ values are not particularly advantageous, for example, for VAN displays, since they require the use of cells having relatively large layer thicknesses, of 4 µm or more, and thus result in response times which are unacceptably long for many applications. Thus, a d·$\Delta n$ of approximately 0.30 µm is employed in the case of an untwisted director alignment.

However, the use of cells having very small layer thicknesses frequently results in low production yields in the displays. For fast-switching displays, $\Delta n$ values in the range from 0.075 to 0.15 are preferably desired. This applies both in the case of ECB displays and also in the case of IPS displays.

Since the response times of the prior art displays, as already mentioned above, are often too long, the viscosities of the liquid-crystal media must be improved and thus reduced. This applies, in particular, to the rotational viscosity $\gamma_1$ and very particularly to the value thereof at low temperatures. A reduction in the flow viscosity $v_{20}$ generally results, in particular in the case of displays having a homeotropic edge alignment of the liquid crystals (for example in the case of ECB and VAN displays), in a very desired shortening of the response times.

For industrial use of this effect in electro-optical display elements, there is a requirement for LC phases which have to satisfy a multiplicity of requirements. Particularly important here are the chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosities.

None of the series of compounds having a liquid-crystalline mesophase that are known to date includes a single compound which meets all these requirements. In general, therefore, mixtures of from two to 25, preferably from three to 18, compounds are prepared in order to obtain substances which can be used as LC phases. However, it has not been possible to prepare optimum phases easily in this way, since no liquid-crystal materials having significantly negative dielectric anisotropy and adequate long-term stability were hitherto available.

The displays based on the ECB effect and optionally on the IPS or PALCD effect have to date required specific, complex matching of the liquid-crystal mixtures to be employed to the particular mode or the particular configuration, in particular concerning Δn and Δε values and the rotational and flow viscosities.

Surprisingly, it has now been found that liquid-crystalline mixtures having negative anisotropy which have a certain ratio of $\gamma_1$ and Δn or the square thereof do not have the disadvantages of the media from the prior art, or at least only do so to a significantly reduced extent. The present mixture concept according to the invention enables negative mixtures which can be employed universally for the ECB effect to be conceived easily for the various modes. The mixtures according to the invention are particularly suitable for VAN displays in the MVA and PVA configurations, furthermore for IPS, FFS and PA LCD.

The present invention thus relates to a liquid-crystalline medium based on a mixture of polar compounds having negative dielectric anisotropy (Δε), which is distinguished by the fact that it has a value for the ratio $\gamma_1/\Delta n^2$ in the range 6-45 Pa·s with a clearing point of >60° C. and a Δε of ≤−2.3.

All values for the ratio of $\gamma_1/\Delta n^2$ indicated in this application have the unit [Pa·s], unless stated otherwise.

The mixtures according to the invention are distinguished by their short response times in ECB displays, a broad nematic phase and relatively high values for the voltage holding ratio (HR). The mixtures according to the invention having a $\gamma_1/\Delta n^2$ ratio of this type furthermore exhibit very favourable values for the capacitive threshold and at the same time very good low-temperature stability.

The Invention therefore also relates to the use of the liquid-crystalline mixtures, in particular for displays based on the ECB, PALCD and IPS effect, and to the corresponding displays containing the mixtures according to the invention.

Preferred embodiments of the mixture concept according to the invention are indicated below.

The mixtures according to the invention preferably have a $\gamma_1/\Delta n^2$ of 6-30, preferably of 6-22.

The values for the optical anisotropy Δn are preferably in the range 0.08-0.12. Particular preference is given to mixtures having a Δn=0.08±0.01, furthermore having a Δn=0.10±0.005 and Δn=0.12±0.01.

The mixtures according to the invention preferably have clearing points of ≥65° C., in particular of ≥69° C.

The thresholds $V_0$ (capacitive) are preferably in the range 1.8-2.3 V.

The temperature stability (LTS) is preferably at least 1000 h at temperatures of ≤−20° C., in particular ≤−30° C. and very particularly preferably ≤−40° C.

Mixtures which satisfy the required ratio of $\gamma_1/\Delta n^2$ preferably have, depending on Δn, ΔE and the clearing point, the following rotational viscosities, as tabulated below:

1. Clearing point 70° C.±5° C. and Δε of −3.0±0.6

| Δn | Rotational viscosities $\gamma_1$ |
|---|---|
| 0.08 ± 0.005 | ≤125 mPa · s, preferably ≤105 mPa · s |
| 0.09 ± 0.005 | ≤130 mPa · s, preferably ≤105 mPa · s |
| 0.10 ± 0.005 | ≤135 mPa · s, preferably ≤110 mPa · s |
| 0.11 ± 0.005 | ≤145 mPa · s, preferably ≤120 mPa · s |
| 0.12 ± 0.005 | ≤150 mPa · s, preferably ≤125 mPa · s |
| 0.13 ± 0.005 | ≤160 mPa · s, preferably ≤135 mPa · s |
| 0.15 ± 0.01 | ≤170 mPa · s, preferably ≤145 mPa · s |

The value for the ratio of $\gamma_1/\Delta n^2$ is preferably in the range 8.6-18.5.

The thresholds are preferably <2.3 V, in particular in the range 2.0-2.3 V.

2. Clearing point 70° C.±5° C. and Δε of −4.0±0.4

| Δn | Rotational viscosities $\gamma_1$ |
|---|---|
| 0.08 ± 0.005 | ≤140 mPa · s, preferably ≤120 mPa · s |
| 0.09 ± 0.005 | ≤165 mPa · s, preferably ≤145 mPa · s |
| 0.10 ± 0.005 | ≤185 mPa · s, preferably ≤150 mPa · s |
| 0.11 ± 0.005 | ≤190 mPa · s, preferably ≤160 mPa · s |
| 0.12 ± 0.005 | ≤195 mPa · s, preferably ≤175 mPa · s |
| 0.13 ± 0.005 | ≤205 mPa · s, preferably ≤180 mPa · s |
| 0.15 ± 0.01 | ≤220 mPa · s, preferably ≤185 mPa · s |

The value for the ratio of $\gamma_1/\Delta n^2$ is preferably in the range 9.5-20.0.

The thresholds are preferably <2.1 V, in particular in the range 1.8-2.1 V.

3. Clearing point 70° C.±5° C. and Δε of −5.0±0.6

| Δn | Rotational viscosities $\gamma_1$ |
|---|---|
| 0.08 ± 0.005 | ≤185 mPa · s, preferably ≤175 mPa · s |
| 0.09 ± 0.005 | ≤200 mPa · s, preferably ≤165 mPa · s |
| 0.10 ± 0.005 | ≤210 mPa · s, preferably ≤165 mPa · s |
| 0.11 ± 0.005 | ≤220 mPa · s, preferably ≤190 mPa · s |
| 0.12 ± 0.005 | ≤230 mPa · s, preferably ≤200 mPa · s |
| 0.13 ± 0.005 | ≤250 mPa · s, preferably ≤210 mPa · s |
| 0.15 ± 0.01 | ≤270 mPa · s, preferably ≤220 mPa · s |

The value for the ratio of $\gamma_1/\Delta n^2$ is preferably in the range 12.0-22.0. In the case of Δn values of 0.08±0.005, the value may also be in the range 26-28. The thresholds are preferably <1.9 V, in particular in the range 1.7-1.8 V.

4. Clearing point 90° C.±5° C. and Δε of −3.0±0.6

| Δn | Rotational viscosities $\gamma_1$ |
|---|---|
| 0.08 ± 0.005 | ≤160 mPa · s, preferably ≤130 mPa · s |
| 0.09 ± 0.005 | ≤170 mPa · s, preferably ≤135 mPa · s |
| 0.10 ± 0.005 | ≤180 mPa · s, preferably ≤140 mPa · s |
| 0.11 ± 0.005 | ≤190 mPa · s, preferably ≤150 mPa · s |
| 0.12 ± 0.005 | ≤200 mPa · s, preferably ≤190 mPa · s |
| 0.13 ± 0.005 | ≤210 mPa · s, preferably ≤195 mPa · s |
| 0.15 ± 0.01 | ≤220 mPa · s, preferably ≤200 mPa · s |

The value for the ratio of $\gamma_1/\Delta n^2$ is preferably in the range 12.0-23.0. The thresholds are preferably <2.6 V, in particular in the range 2.30-2.55 V.

5. Clearing point 90° C.±5° C. and Δε of −4.0±0.4

| Δn | Rotational viscosities $\gamma_1$ |
|---|---|
| 0.08 ± 0.005 | ≤185 mPa · s, preferably ≤150 mPa · s |
| 0.09 ± 0.005 | ≤195 mPa · s, preferably ≤160 mPa · s |
| 0.10 ± 0.005 | ≤215 mPa · s, preferably ≤200 mPa · s |
| 0.11 ± 0.005 | ≤215 mPa · s, preferably ≤190 mPa · s |

-continued

| Δn | Rotational viscosities $\gamma_1$ |
|---|---|
| 0.12 ± 0.005 | ≤215 mPa·s, preferably ≤200 mPa·s |
| 0.13 ± 0.005 | ≤235 mPa·s, preferably ≤210 mPa·s |
| 0.15 ± 0.01 | ≤250 mPa·s, preferably ≤210 mPa·s |

The value for the ratio of $\gamma_1/\Delta n^2$ is preferably in the range 14.5-22.0.

The thresholds are preferably <2.25 V, in particular in the range 2.00-2.25 V.

6. Clearing point 90° C.±5° C. and Δε of −5.0±0.6

| Δn | Rotational viscosities $\gamma_1$ |
|---|---|
| 0.08 ± 0.005 | ≤280 mPa·s, preferably ≤265 mPa·s |
| 0.09 ± 0.005 | ≤275 mPa·s, preferably ≤260 mPa·s |
| 0.10 ± 0.005 | ≤275 mPa·s, preferably ≤260 mPa·s |
| 0.11 ± 0.005 | ≤275 mPa·s, preferably ≤265 mPa·s |
| 0.12 ± 0.005 | ≤280 mPa·s, preferably ≤265 mPa·s |

The value for the ratio of $\gamma_1/\Delta n^2$ is preferably in the range 18.0-25.0. In the case of Δn values of 0.08±0.005, the value may also be in the range 40-45. The thresholds are preferably <2.0 V, in particular in the range 1.8-2.0 V.

Mixtures according to the invention having clearing points of 75-85° C. each have $\gamma_1/\Delta n^2$ values and $\gamma_1$ values between the above-mentioned limits for 70±5° C. and 90±5° C.

Preferred embodiments of the mixtures according to the invention with respect to their composition are mentioned below:

a) Liquid-crystalline medium which comprises at least two compounds of the formulae IA, IB and/or II

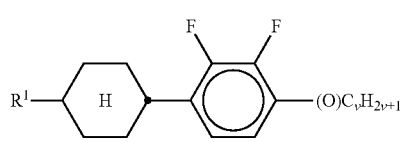
IA

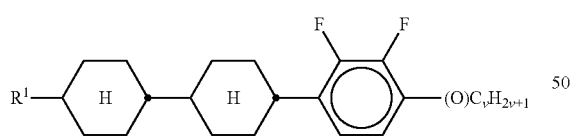
IB

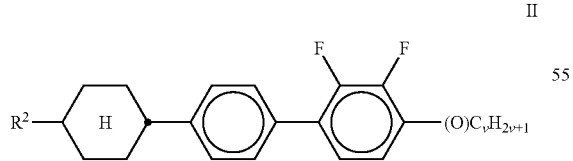
II in which
R¹ and R² each, independently of one another, denote H, an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

,

—C≡C—, —OCF₂—, —CF₂O—, —OC—O— or —O—CO— in such a way that O atoms are not linked directly to one another, and v denotes 1 to 6.

R¹ and R² preferably denote straight-chain alkyl or straight-chain alkenyl.

Preferred mixtures, in particular having an n value of 0.08-0.09, comprise in total four compounds of the formulae

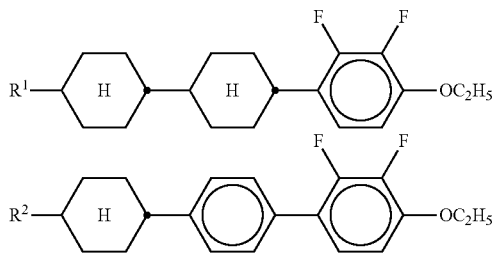

b) Liquid-crystalline medium which additionally comprises one or more compounds of the formula III

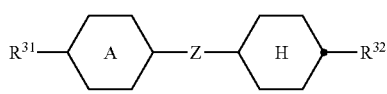
III in which
R³¹ and R³² each, independently of one another, denote a straight-chain alkyl, alkylalkoxy or alkoxy radical having up to 12 C atoms, and

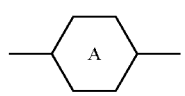

denotes

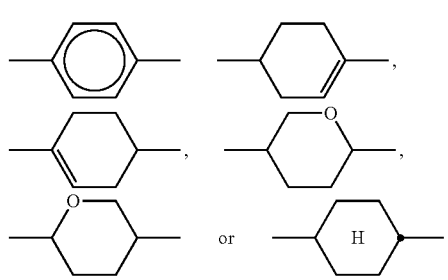

and
Z denotes a single bond, —C₂H₄—, —CH═CH—, —(CH₂)₄—, —(CH₂)₃O—, —O(CH₂)₃—, —CH═CHCH₂CH₂—, —CH₂CH₂CH═CH—, —CH₂O—, —OCH₂—, —CF₂O—, —OCF₂—, —COO—, —OCO—, —C₂F₄—, —CHFCF₂—, —CF═CF—, —CH═CF—, —CF═CH—, —CH₂—.

The mixtures according to the invention may comprise up to 50% by weight of neutral compounds, preferably selected from the compounds of the formula III.

c) Liquid-crystalline medium which comprises four, five, six or more, preferably two or three, compounds of the formulae IA and/or IB.
d) Liquid-crystalline medium in which $R^1$ and $R^2$ in the formulae IA and IB preferably have the following meanings: straight-chain alkyl, vinyl, 1E-alkenyl or 3-alkenyl. If $R^1$ and/or $R^2$ denote alkenyl, it is preferably $CH_2$=CH, $CH_3$—CH=CH, $C_3H_7$—CH=CH, $CH_2$=CH—$C_2H_4$ or $CH_3$—CH=CH—$C_2H_4$.

In the compounds IA, IB and II, v preferably denotes 2, 3 or 4.

e) Liquid-crystalline medium in which the proportion of compounds of the formulae IA and/or IB in the mixture as a whole is at least 10% by weight, preferably at least 25% by weight and very particularly preferably ≥30% by weight.
f) Liquid-crystalline medium in which the proportion of compounds of the formula II in the mixture as a whole is at least 10% by weight.
g) Liquid-crystalline medium comprising at least two, preferably three, compounds of the formula II, in particular of the formula

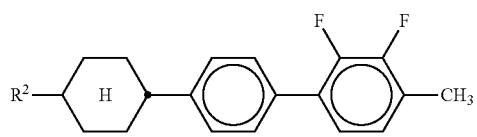

$R^2$ preferably denotes ethyl, propyl or pentyl.

h) Liquid-crystalline medium in which the proportion of compounds of the formula III in the mixture as a whole is at least 5% by weight.
i) Liquid-crystalline medium which additionally comprises a compound selected from the formulae IIIa to IIIj:

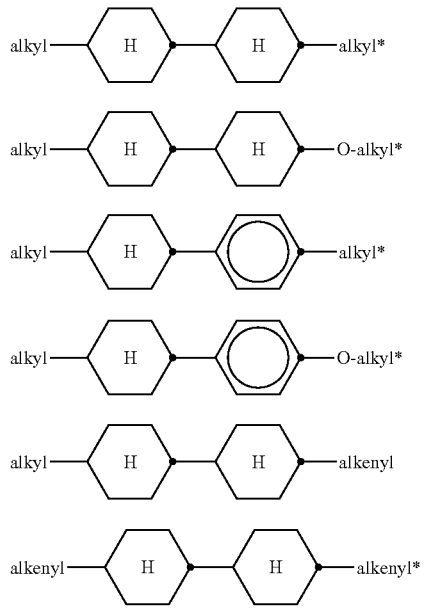

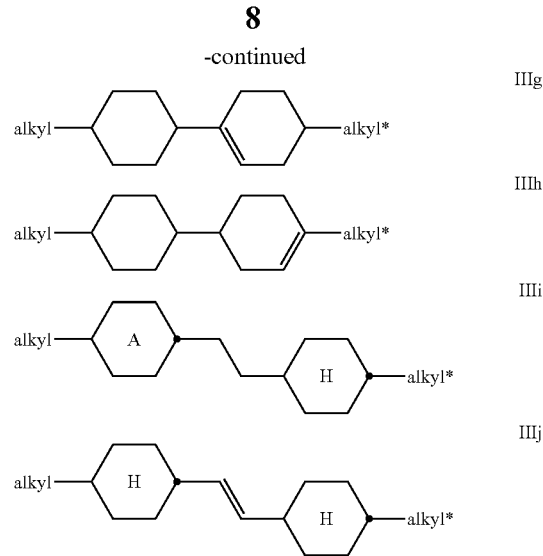

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms, preferably vinyl, 1E-alkenyl or 3E-alkenyl.

The medium according to the invention preferably comprises at least one compound of the formula IIIa, formula IIIb and/or formula IIIe, preferably in amounts of >5% by weight, in particular >10% by weight, very particularly preferably >20% by weight.

Particularly preferred compounds of the formulae IIIe and IIIf are mentioned below:

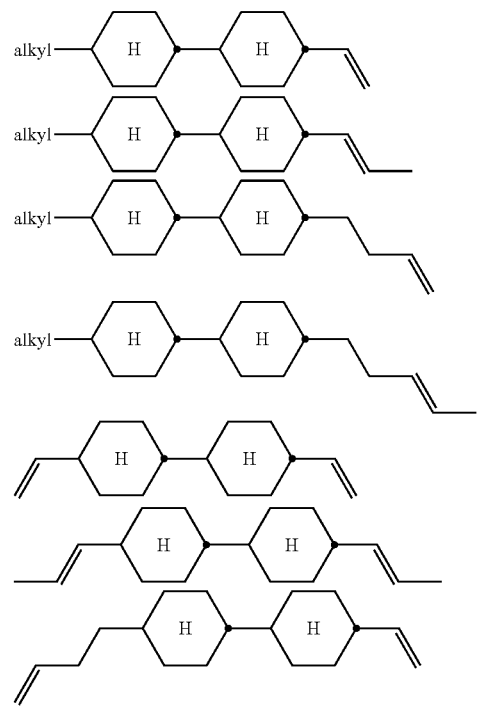

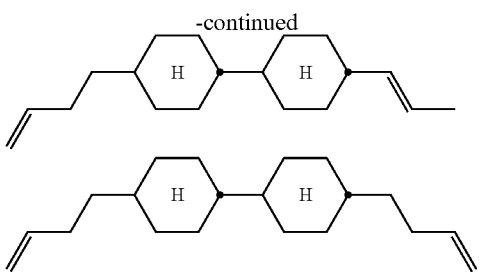

j) Liquid-crystalline medium which comprises at least three compounds of the formula IIIe, preferably selected from the group of the compounds IIIe-1

IIIe-2

IIIe-3

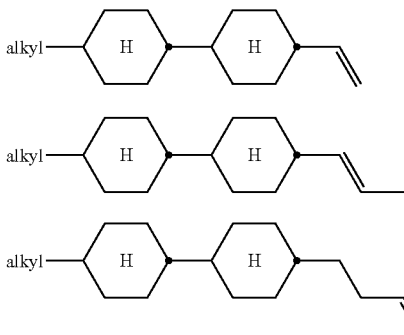

The proportion of the compounds IIIe-1, IIIe-2 and/or IIIe-3 in the mixture, preferably having a Δn=0.08 (±0.005), is preferably ≥20% by weight, in particular ≥30% by weight, alkyl preferably denotes $C_nH_{2n+1}$, where n=3, 4 or 5.

Preference is furthermore given to media which comprise the compound of the formula

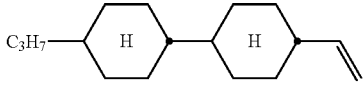

preferably in concentrations >20% by weight, in particular >30% by weight, preferably in combination with the compound of the formula

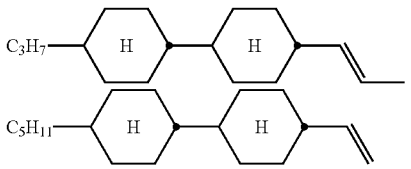

The latter compounds are preferably present in the mixture in amounts of 5-40% by weight.

k) Liquid-crystalline medium which essentially consists of:
   10-40% by weight of one or more compounds of the formulae IA and IB, and
   10-40% by weight of one or more compounds of the formula II.

l) Liquid-crystalline medium which additionally comprises one or more tetracyclic compounds of the formulae

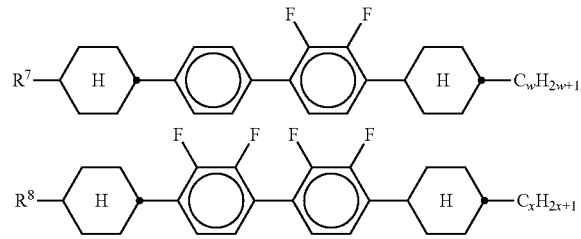

in which
  $R^7$ and $R^8$ each, independently of one another, have one of the meanings indicated for $R^1$ in Claim 1, and
  w and x each, independently of one another, denote 1 to 6.

m) Particularly preferred media comprise one or more indane compounds selected from the group of the compounds of the formulae In-a to In-d:

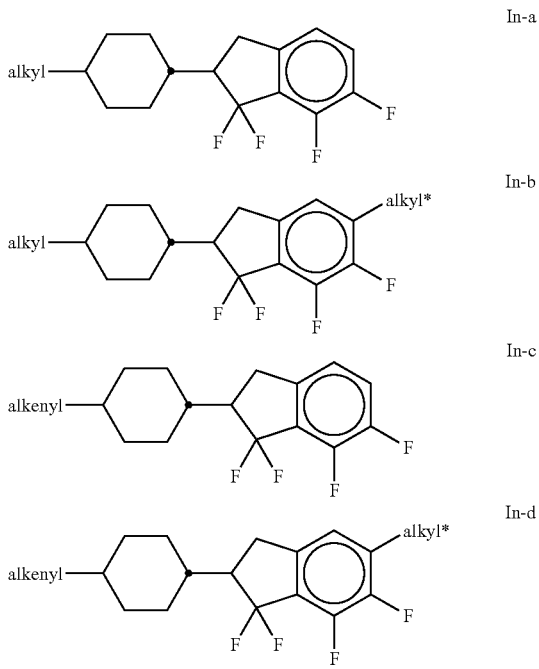

in which
  alkyl and
  alkyl* each, independently of one another, denote a straight-chain alkyl radical having 1-6 C atoms, and
  alkenyl denotes a straight-chain alkenyl radical having 2-6 C atoms.
  alkyl* preferably denotes $CH_3$, $C_2H_5$ or n-$C_3H_7$.

The mixtures according to the invention preferably comprise a compound of the formula In-a or In-b, in particular a compound of the formula In-a. The proportion of the indane compounds in the mixture as a whole is at least 5% by weight, preferably at least 10% by weight.

n) Liquid-crystalline medium which additionally comprises one or more compounds of the formulae

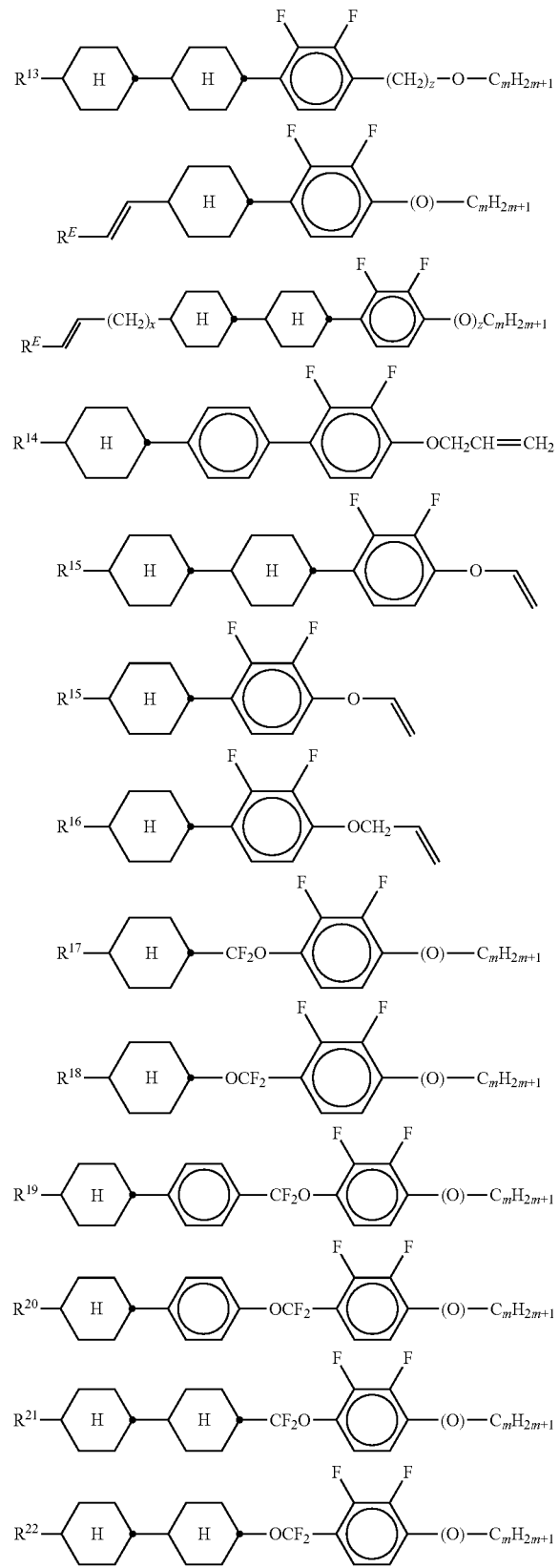

in which $R^{13}$-$R^{27}$ each, independently of one another, have the meanings indicated for $R^1$, and z and m each, independently of one another, denote 1-6. $R^E$ denotes H, $CH_3$, $C_2H_5$ or n-$C_3H_7$, and x denotes 0, 1, 2 or 3.

The said compounds are preferably each present in the mixture as a whole in amounts of at least 5% by weight.

Mixtures having a Δn in the range 0.08-0.12 preferably comprise compounds of the formula in concentrations of ≥5% by weight, preferably a ≥10% by weight.

Mixtures of this type furthermore comprise compounds of the formula II in amounts of ≥2% by weight.

The compounds of the formula are particularly suitable for mixtures having a Δn value in the range 0.07-0.10, in particular 0.07-0.09. These compounds, in which R² preferably denotes alkyl, are preferably employed in concentrations of 5-20% by weight.
o) Liquid-crystalline medium additionally comprising one or more fluorinated terphenyls of the formulae T-1 to T-22
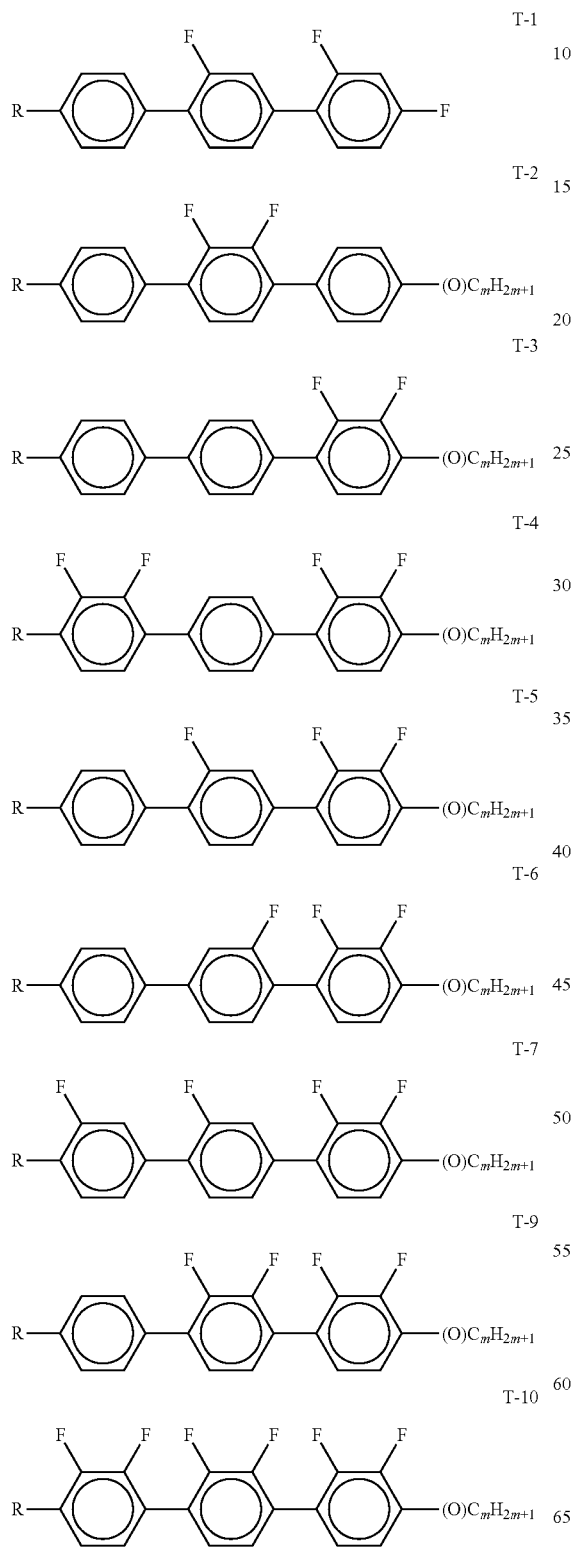
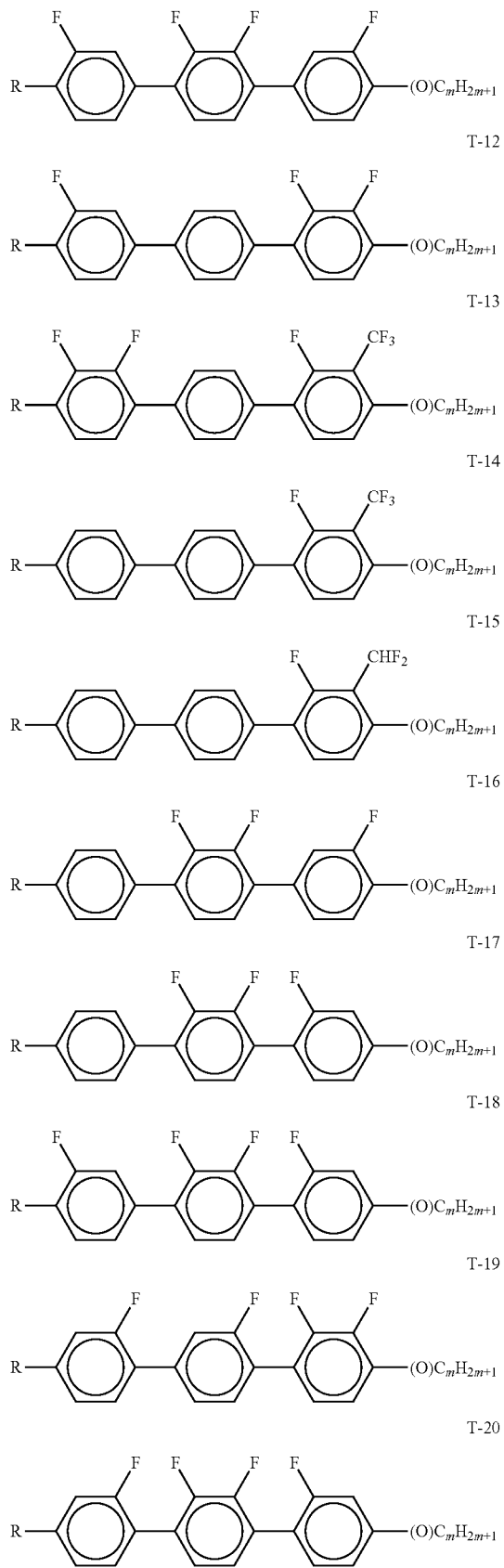

-continued

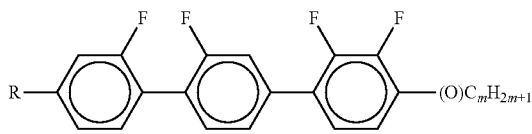
T-21

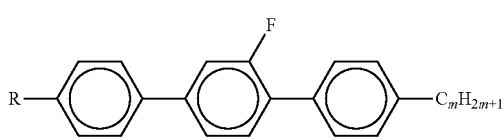
T-22 in which

R has the meanings indicated for R¹.

R is preferably straight-chain alkyl, alkoxy or alkylalkoxy, each having 1-6 C atoms, alkenyl or alkenyloxy having 2-6 C atoms. R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-22 in amounts of 2-30% by weight, in particular of 5-20% by weight.

Particular preference is given to compounds of the formulae T-1, T-2, T-3 and T-22. In these compounds, R preferably denotes alkyl, furthermore alkoxy, each having 1-5 C atoms.

The terphenyls are preferably employed in mixtures having a Δn≥0.10 in combination with the compounds of the formulae IA, IB and II. Preferred mixtures comprise 2-20% by weight of terphenyls and 5-30% by weight of the compounds of the formula II.

p) Liquid-crystalline medium additionally comprising one or more biphenyls of the formulae B-1 to B-4

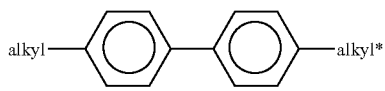
B-1

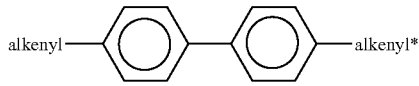
B-2

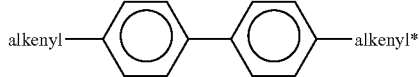
B-3

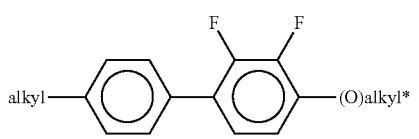
B-4 in which alkyl, alkyl*, alkenyl and alkenyl* have the above-mentioned meanings.

The proportion of the biphenyls of the formulae B-1 to B-4 in the mixture as a whole is preferably at least 3% by weight, in particular ≥5% by weight.

Of the compounds of the formulae B-1 to B-4, the compounds of the formulae B-1 and B-4 are particularly preferred.

Preferred biphenyls are likewise

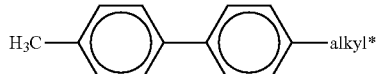

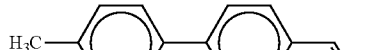

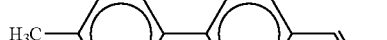

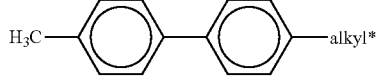

q) Liquid-crystalline medium additionally comprising one or more esters of the formulae E-1 to E-3

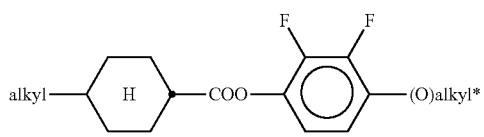
E-1

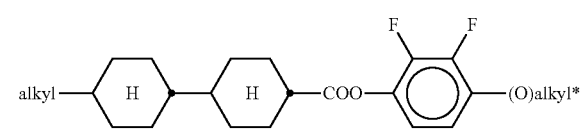
E-2

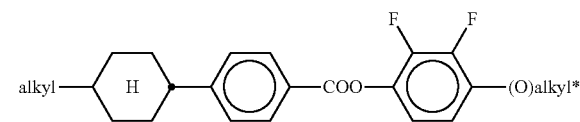
E-3 in which alkyl and alkyl* have the above-mentioned meanings.

The proportion of the esters in the mixture as a whole is preferably at least 10% by weight, in particular ≥30% by weight.

Of the compounds E-1 to E-3, the compound E-1 is particularly preferred.

r) Liquid-crystalline medium additionally comprising one or more tolans of the formulae To-1 and To-2

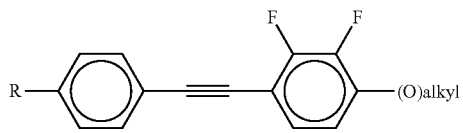
To-1

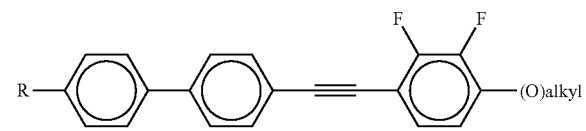
To-2 in which R and alkyl have the above-mentioned meanings.

The proportion of the tolans To-1 and/or To-2 in the mixture as a whole is preferably at least 5% by weight, in particular ≥20% by weight.

In the compounds To-1 and To-2, R preferably denotes straight-chain alkyl or alkoxy.

s) Liquid-crystalline medium additionally comprising one or more nitriles of the formulae N-1 and N-2

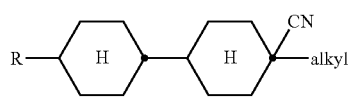

N-1

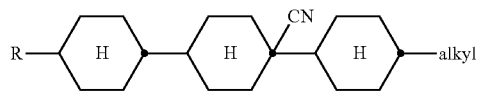

N-2 in which R and alkyl have the above-mentioned meanings.

The proportion of the nitriles in the mixture as a whole is preferably at least 5% by weight, in particular ≥25% by weight.

t) Liquid-crystalline medium comprising at least 10% by weight, preferably ≥15% by weight, in particular ≥20% by weight, of compounds of the formula B-4. Compounds of this type are preferably used in mixtures having a Δn≥0.12. The biphenyls of the formula B-4 are preferably employed in combination with compounds of the formulae II and/or B-1.

Preferred mixtures having a Δn≥0.12 comprise at least 15% by weight of compounds of the formula II and/or ≥5% by weight of compounds of the formula B-1 besides the compounds of the formula B-4.

Compounds of the formula B-4 are furthermore preferably employed in combination with terphenyls, preferably with T-1, T-2 and/or T-3.

u) Liquid-crystalline medium comprising at least one compound of the formulae Z-1 to Z-10

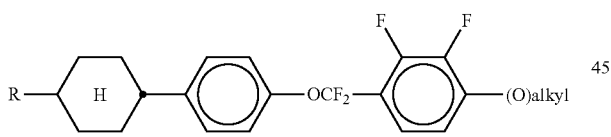

Z-1

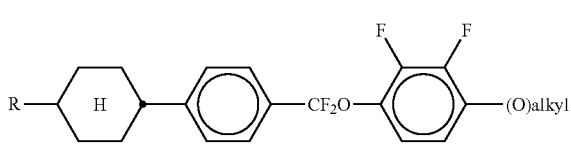

Z-2

Z-3

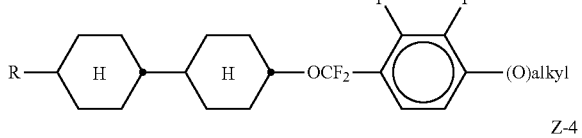

Z-4

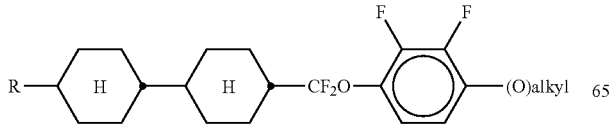

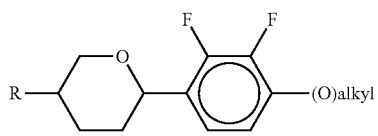

Z-5

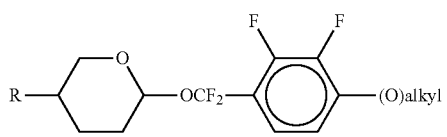

Z-6

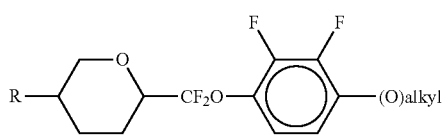

Z-7

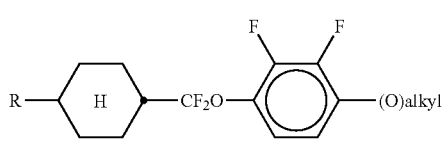

Z-8

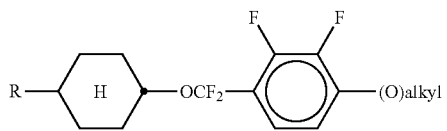

Z-9

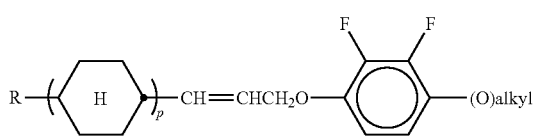

Z-10 in which R and alkyl have the above-mentioned meanings, and p is 1 or 2, preferably in amounts of ≥5% by weight, in particular ≥10% by weight.

Particular preference is given to media which comprise one, two or more compounds of the formulae Z-1 to Z-7 and additionally one, two or more compounds of the formula II. Mixtures of this type preferably comprise ≥10% by weight of compounds of the formula II and optionally also compounds of the formula IA.

v) Liquid-crystalline medium comprising at least one compound of the formula

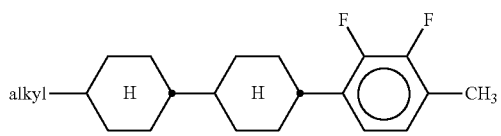

IB-M

Preferred compounds of the formula IB-M are the compounds IB-M1 to IB-M3:

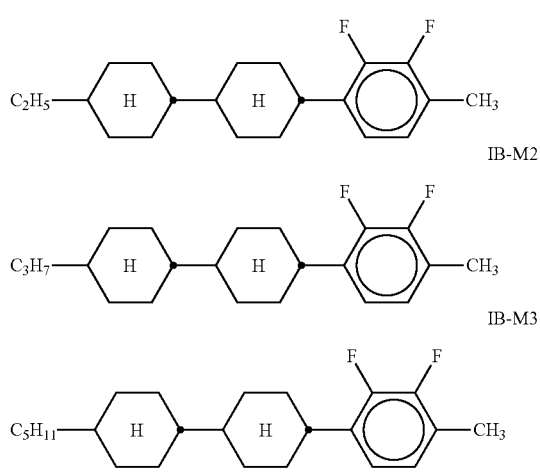

IB-M1

IB-M2

IB-M3

The mixtures according to the invention preferably comprise at least one compound of the formula IB-M, in particular the compound IB-M1, IB-M2 and/or IB-M3, and at least one compound

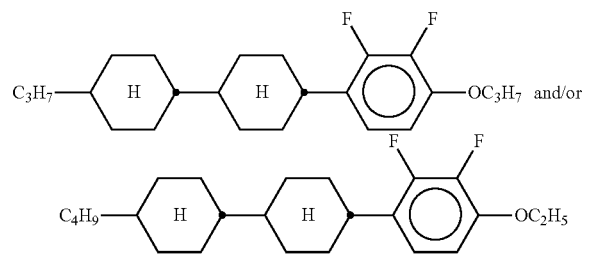

w) Liquid-crystalline medium comprising at least one compound of the formulae

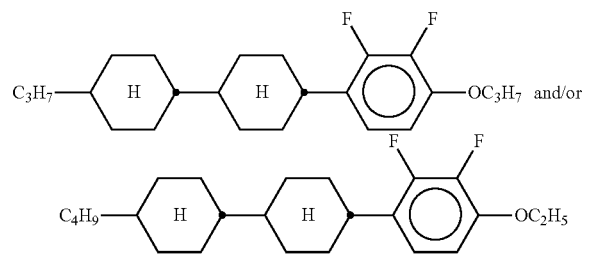

preferably in amounts of 5-20% by weight, in particular in combination with one or more compounds of the formulae T-1 to T-21.
x) Liquid-crystalline medium comprising at least one compound of the formula T-1 and at least one compound of the formula T-4.
y) Liquid-crystalline medium comprising at least one compound of the formula

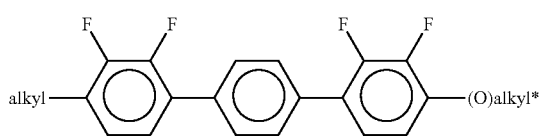

and at least one compound of the formula

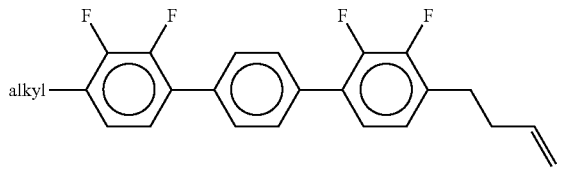

The invention furthermore relates to an electro-optical display having active-matrix addressing based on the ECB effect, characterised in that it contains, as dielectric, a liquid-crystalline medium according to one of Claims 1 to 17.

The liquid-crystal mixture preferably has a nematic phase range of at least 60 K and a flow viscosity $v_{20}$ of at most 30 mm²·s⁻¹, preferably <25 mm²·s⁻¹, at 20° C.

The liquid-crystal mixture according to the invention has a $\Delta\varepsilon$ of about −2.3 to −8.0, in particular about −3.0 to −6.0, very particularly preferably ≤−3.0 to −5.0.

The rotational viscosity $\gamma_1$ is preferably <200 mPa·s, in particular <190 mPa·s.

z) Liquid-crystalline medium comprising at least one compound of the formulae O-1 to O-11

O-1

O-2

O-3

O-4

O-5

O-6

O-7

O-8

-continued

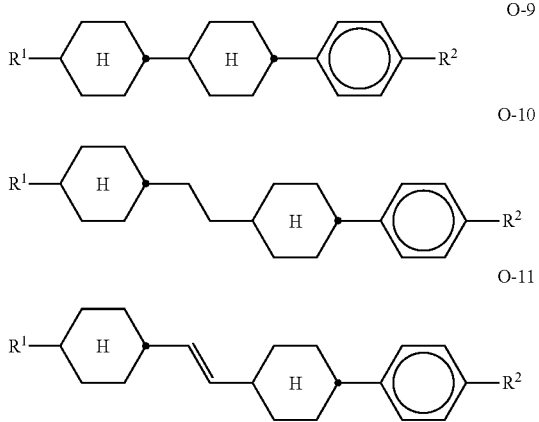

in which $R^1$ and $R^2$ have the above-mentioned meanings, $R^1$ and $R^2$ preferably each, independently of one another, denote straight-chain alkyl, furthermore alkenyl.

Preferred liquid-crystalline media according to the invention comprise one or more substances having a $\Delta\varepsilon<2.3$ which contain a tetrahydronaphthyl or naphthyl unit, such as, for example, the compounds of the formulae N-1 to N-5

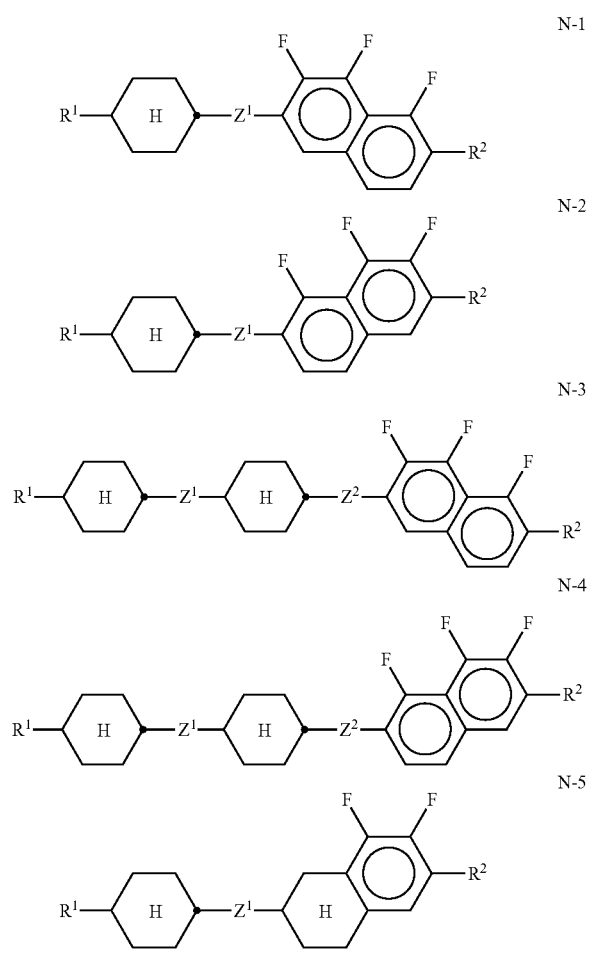

in which $R^1$ and $R^2$ each, Independently of one another, have the above-mentioned meanings, preferably denote straight-chain alkyl, straight-chain alkoxy or straight-chain alkenyl, and Z, $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

The birefringence Δn in the liquid-crystal mixture is, generally, between 0.07 and 0.16, preferably between 0.08 and 0.12.

The mixtures according to the invention are suitable for all VA-TFT applications, such as, for example, VAN, MVA, (S)-PVA, ASV. They are furthermore suitable for IPS (in plane switching) and FFS (fringe field switching) LCD applications having negative Δε.

The individual components of the formulae IA, IB, II and III of the liquid-crystal phases according to the invention are either known or their preparation methods can readily be derived from the prior art by the relevant person skilled in the art since they are based on standard methods described in the literature.

The nematic liquid-crystal mixtures in the displays according to the invention generally comprise two components A and B, which themselves consist of one or more individual compounds.

Component A has clearly negative dielectric anisotropy and provides the nematic phase with a dielectric anisotropy of ≤−2.3. It preferably comprises compounds of the formulae IA and/or IB and II.

The proportion of component A is preferably between 45 and 100%, in particular between 60 and 100%.

For component A, one (or more) individual compound(s) having a value of Δε≤−0.8 is (are) preferably selected. This value must be more negative the smaller the proportion of A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

Particularly preferred individual compounds of component B are extremely low-viscosity nematic liquid crystals having a flow viscosity of not greater than 18, preferably not greater than 12 mm$^2$·s$^{-1}$, at 20° C. Component B is monotropically or enantiotropically nematic, has no smectic phases and can prevent the occurrence of smectic phases in liquid-crystal mixtures down to very low temperatures. If, for example, various materials having high nematogeneity are each added to a smectic liquid-crystal mixture, the nematogeneity of these materials can be compared through the degree of suppression of smectic phases that is achieved. A multiplicity of suitable materials is known to the person skilled in the art from the literature. Particular preference is given to compounds of the formula III, furthermore compounds of the formulae B-1 to B-4, O-1 and O-2.

In addition, these liquid-crystal phases may also comprise more than 18 components, preferably 18 to 25 components.

The phases preferably comprise 4 to 15, in particular 5 to 12, compounds of the formulae IA and/or IB, II and optionally III.

Besides compounds of the formulae IA and/or IB, II and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as constituents of liquid-crystal phases of this type can be characterised by the formula IV $$R^9\text{-L-G-E-}R^{10} \qquad \text{IV}$$

in which L and E each denote a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | |
|---|---|
| —CH=CH— | —N(O)=N— |
| —CH—CQ— | —CH=N(O)— |
| —C≡C— | —CH$_2$—CH$_2$— |
| —CO—O— | —CH$_2$—O— |
| —CO—S— | —CH$_2$—S— |
| —CH=N— | —COO-Phe-COO— |
| —CF$_2$O— | —CF=CF— |

| G denotes | |
|---|---|
| —OCF$_2$ | —OCH$_2$— |
| —(CH$_2$)$_4$— | —(CH$_2$)$_3$O— | or a C—C single bond, Q denotes halogen, preferably chlorine, or —CN, and $R^9$ and $R^{10}$ each denote alkyl, alkenyl, alkoxy, alkanoyloxy or alkoxy-carbonyloxy having up to 18, preferably up to 8, carbon atoms, or one of these radicals alternatively denotes CN, NC, NO$_2$, NCS, SCN, CF$_3$, OCF$_3$, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PA LCD mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

Besides the compounds of the formulae IA, IB, II and III, the mixtures according to the invention preferably comprise one or more of the compounds mentioned above.

The following abbreviations are used:
(n, m=1-6; z=1-6)

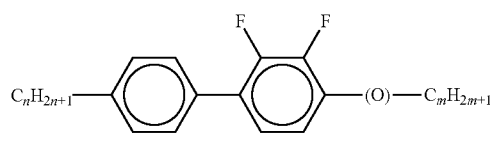

B-n(O)mFF

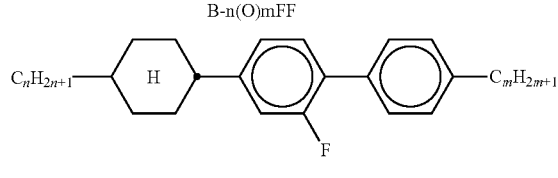

BCH-nmF

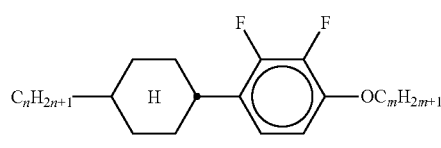

CY-n-Om

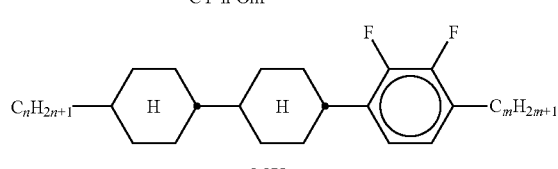

CCY-n-m

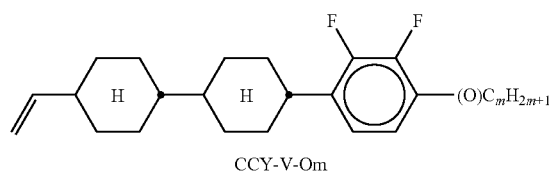

CCY-V-Om

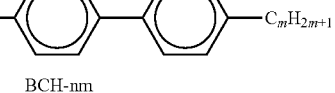

BCH-nm

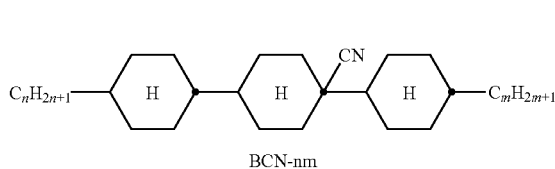

BCN-nm

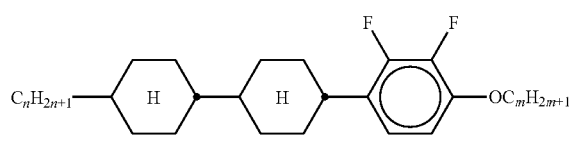

CCY-n-Om

-continued
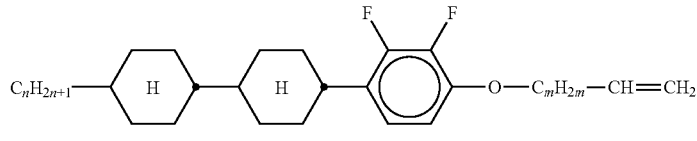
CCY-n-OmV
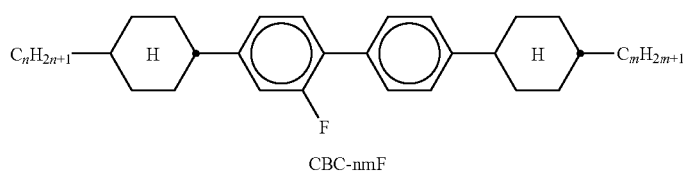
CBC-nmF
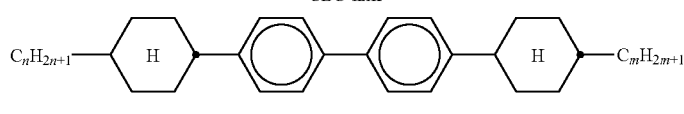
CBC-nm
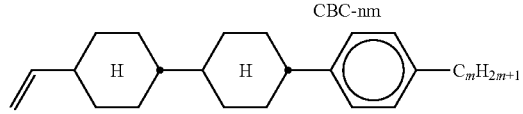
CCP-V-m
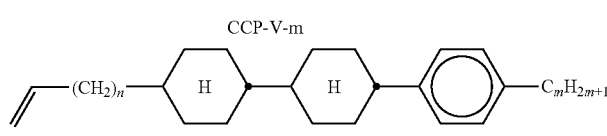
CCP-Vn-m
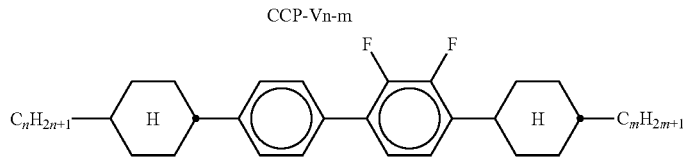
CPYC-n-m
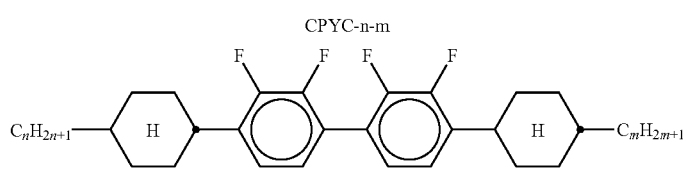
CYYC-n-m
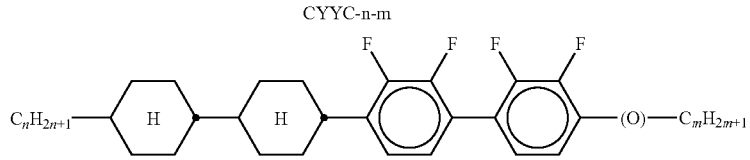
CCYY-n-(O)m
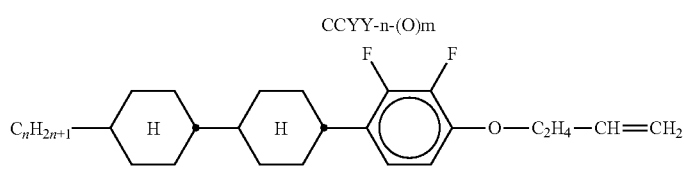
CCY-n-O2V
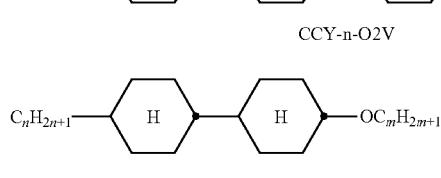
CCH-nOm
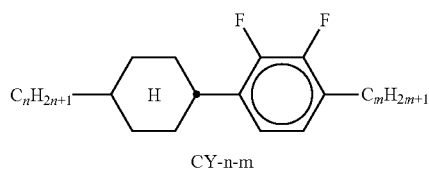
CY-n-m
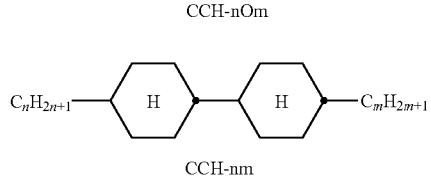
CCH-nm
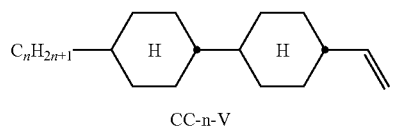
CC-n-V -continued CC-n-V1

CVC-n-m

CC-n-mV

CCOC-n-m

CP-nOmFF

CH-nm

CEY-V-n

CVY-V-n

CY-V-On

CY-n-O1V

CY-n-OC(CH$_3$)=CH$_2$

CCN-nm

CY-n-OV

CCPC-nm

CCY-n-zOm

CPY-n-(O)m

-continued
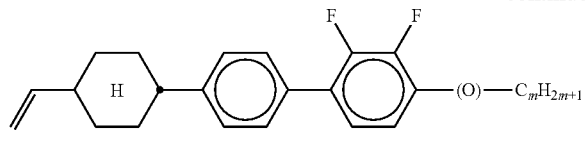
CPY-V-Om
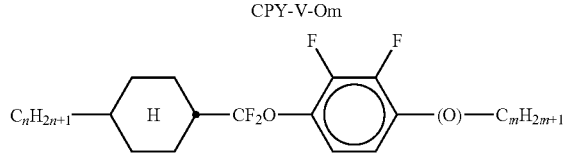
CQY-n-(O)m
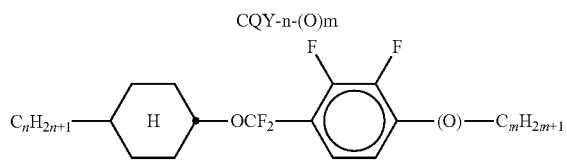
CQIY-n-(O)m
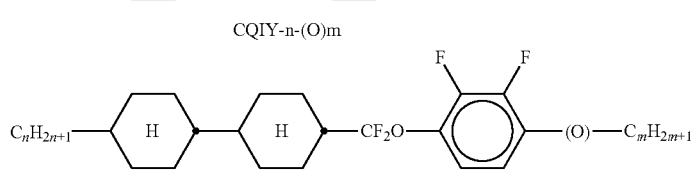
CCQY-n-(O)m
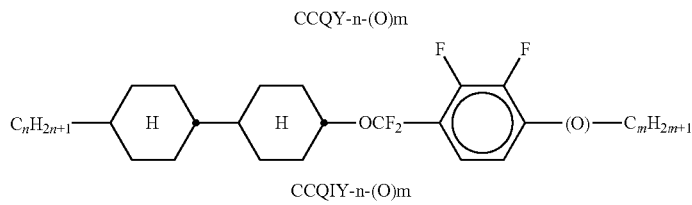
CCQIY-n-(O)m
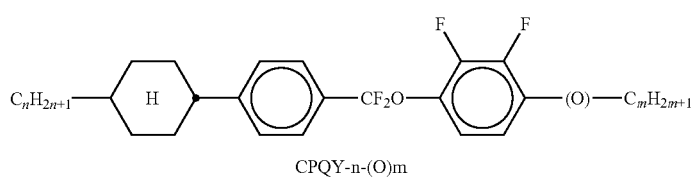
CPQY-n-(O)m
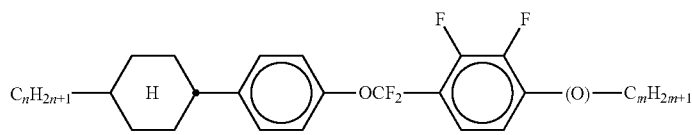
CPQIY-n-(O)m
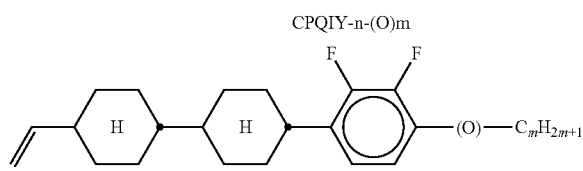
CCY-V-(O)m
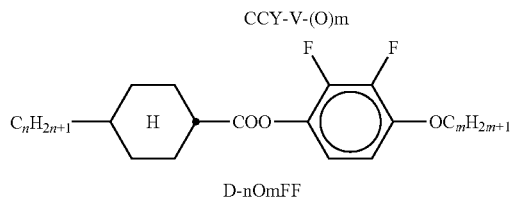
D-nOmFF
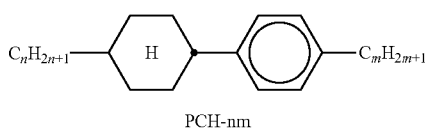
PCH-nm
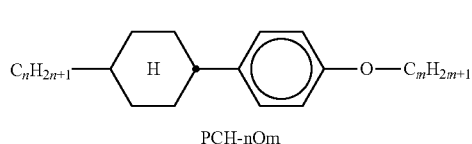
PCH-nOm
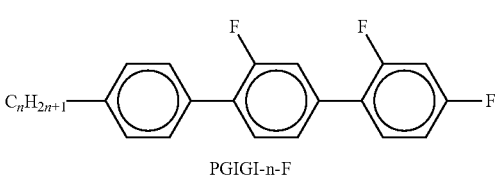
PGIGI-n-F -continued

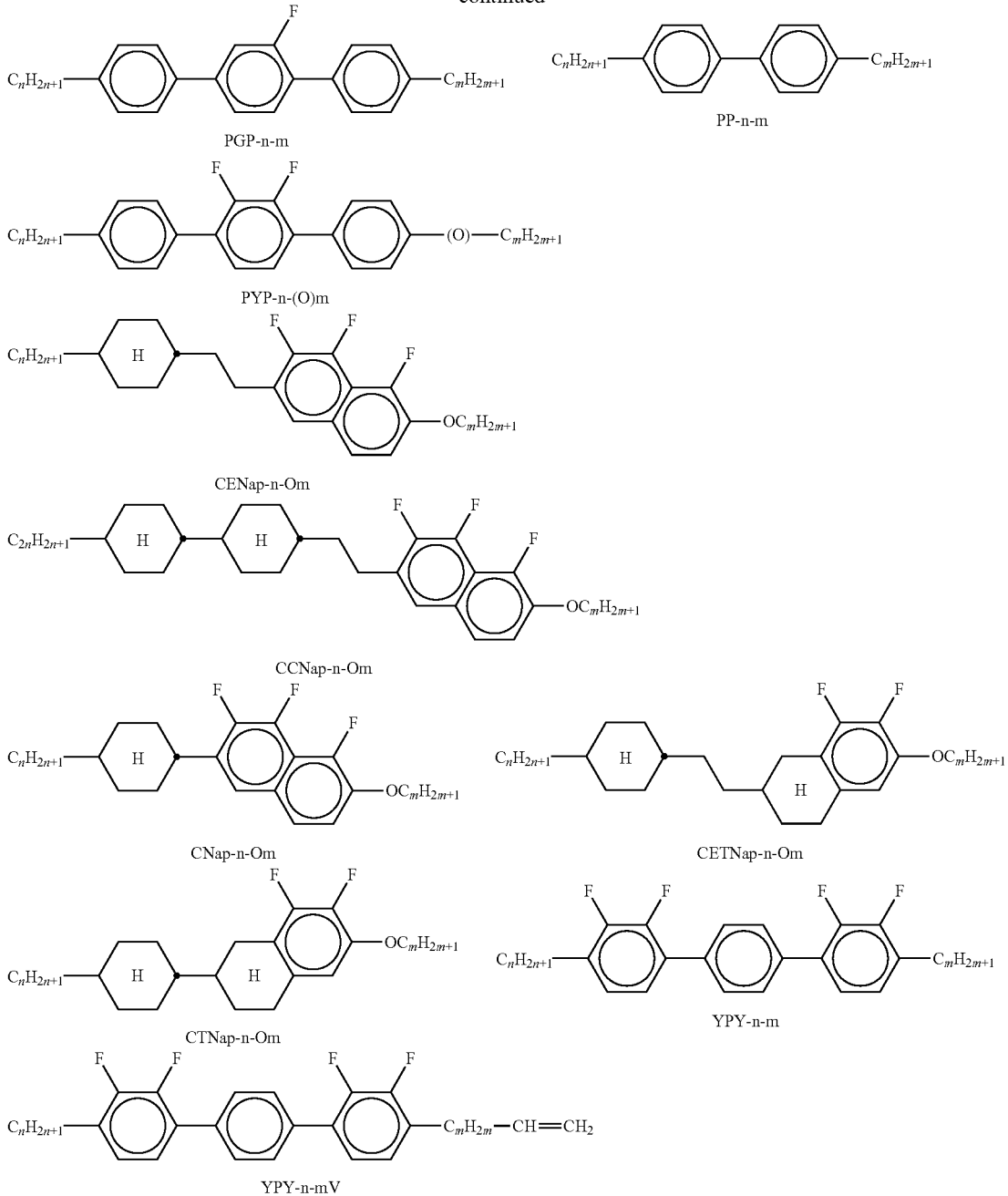

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

In the present application, the term dielectrically positive compounds denotes compounds having a $\Delta\varepsilon > 1.5$, the term dielectrically neutral compounds denotes those having $-1.5 \Delta\varepsilon \leq 1.5$ and the term dielectrically negative compounds denotes those having $\Delta\varepsilon < -1.5$. The dielectric anisotropy of the compounds is determined here by dissolving 10% of the compounds in a liquid-crystalline host and determining the capacitance of this mixture in at least one test cell in each case having a layer thickness of 20 μm with a homeotropic and with a homogeneous surface alignment at 1 kHz. The measurement voltage is typically 0.5 V to 1.0 V, but is always lower than the capacitive threshold of the respective liquid-crystal mixture.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed.

The term threshold voltage relates in a conventional manner to the optical threshold for 10% relative contrast ($V_{10}$), unless explicitly stated otherwise.

In the present application, however, the term threshold voltage is used for the capacitive threshold voltage ($V_0$), also known as the Freedericks threshold, in relation to the liquid-crystal mixtures having negative dielectric anisotropy, unless explicitly stated otherwise.

All concentrations in this application, unless explicitly noted otherwise, are indicated in percent by weight and relate to the corresponding mixture or mixture component. All physical properties are determined in accordance with "Merck Liquid Crystals, Physical Properties of Liquid Crystals", Status November 1997, Merck KGaA, Germany, and apply for a temperature of 20° C., unless explicitly stated otherwise. An is determined at 589 nm and Δε at 1 kHz.

For the liquid-crystal media having negative dielectric anisotropy, the threshold voltage is determined as the capacitive threshold $V_0$ (also known as the Freedericks threshold) in test cells produced at Merck KGaA, Germany, with liquid crystal homeotropically aligned by alignment layer SE 1211 from Nissan Chemicals.

The dielectrics may also comprise further additives known to the person skilled in the art and described in the literature, such as, for example, UV absorbers, antioxidants, free-radical scavengers. For example, 0-15% of pleochroic dyes may be added, furthermore conductive salts, preferably ethyldimethyldodecylammonium 4-hexyloxybenzoate, tetrabutylammonium tetraphenylborate or complex salts of crown ethers (cf., for example, Hailer et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The liquid-crystal media according to the Invention may, if necessary, also comprise chiral dopants in the conventional amounts. The amount of these dopants employed is in total 0 to 10%, based on the amount of the mixture as a whole, preferably 0.1 to 6%. The concentration of the individual compounds employed is preferably 0.1 to 3%. The concentration of these and similar additives is not taken into account when indicating the concentrations and the concentration ranges of the liquid-crystal compounds in the liquid-crystal media.

Table A indicates possible dopants which can be added to the mixtures according to the invention.

TABLE A

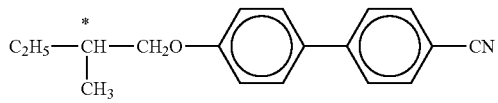

C 15

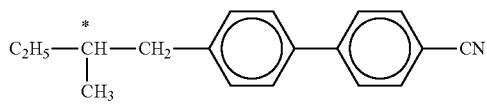

CB 15

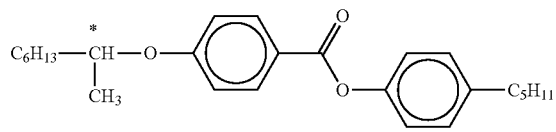

CM 21

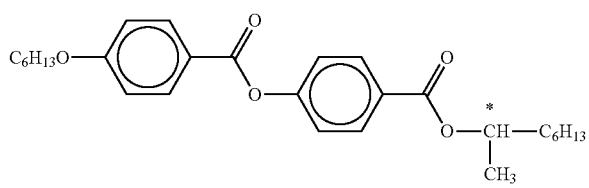

R/S-811

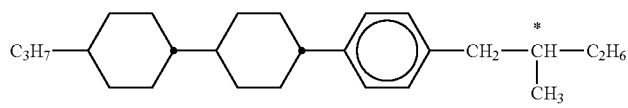

CM 44

TABLE A-continued
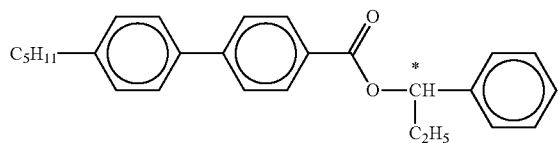
CM 45
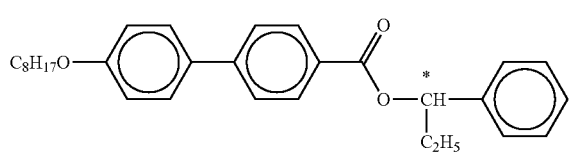
CM 47
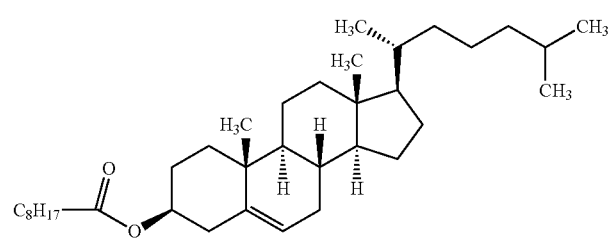
CN
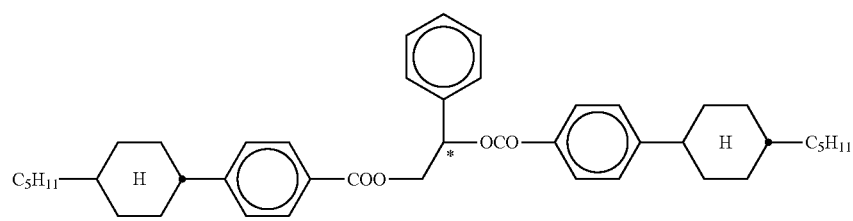
R/S-1011
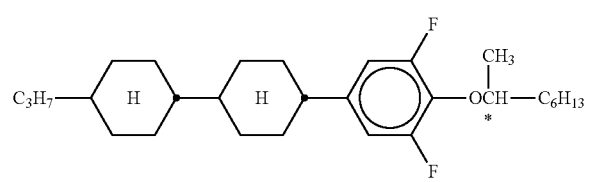
R/S-2011
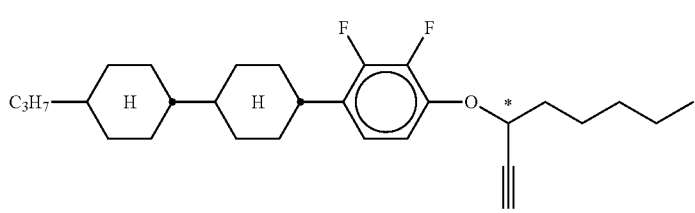
R/S-3011
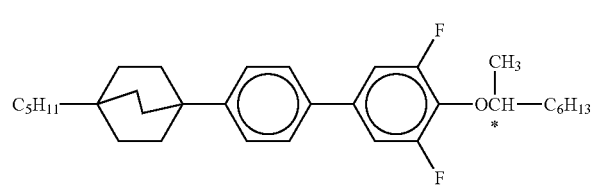
R/S-4011

TABLE A-continued
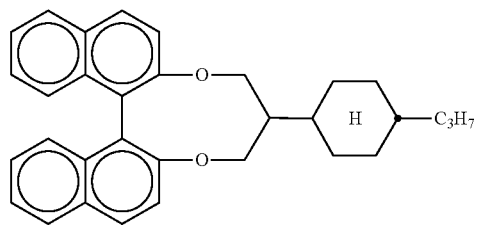
R/S-5011
Stabilisers which can be added, for example, to the mixtures according to the invention in amounts of 0-10% are mentioned below in Table B.
TABLE B
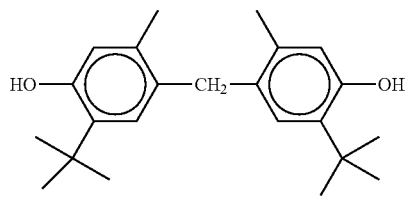
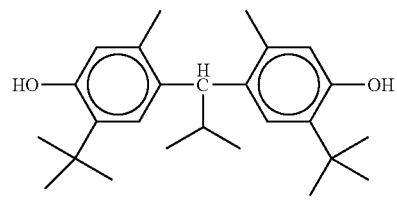
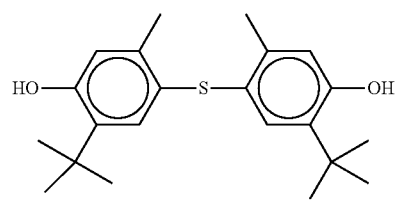
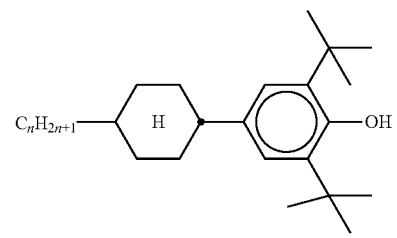
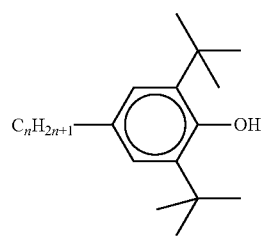

TABLE B-continued
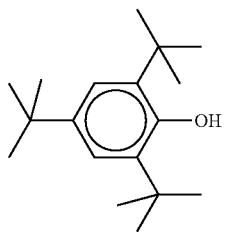
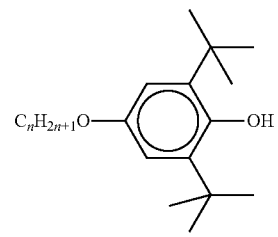
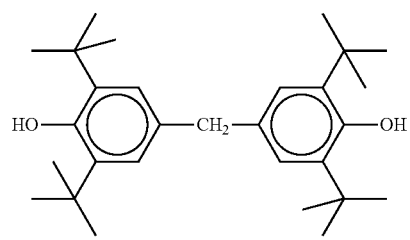
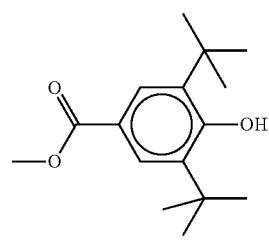
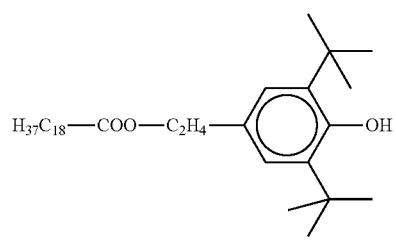
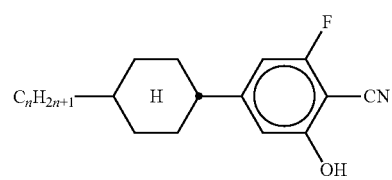
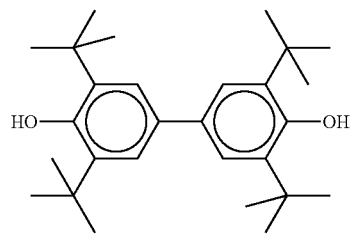

TABLE B-continued
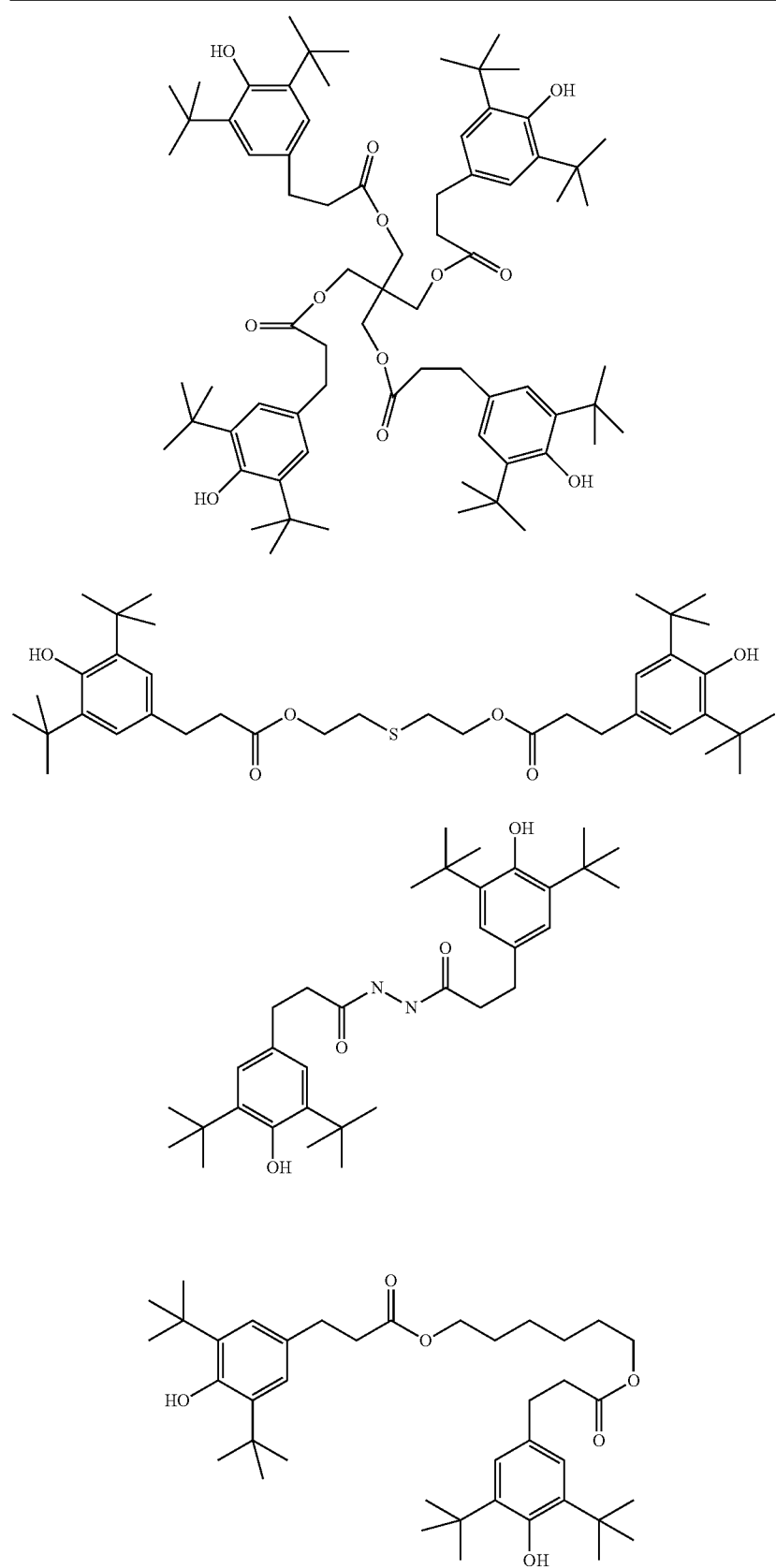

TABLE B-continued
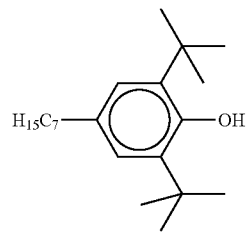
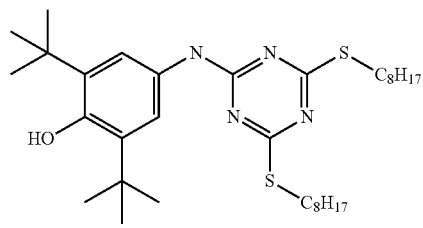
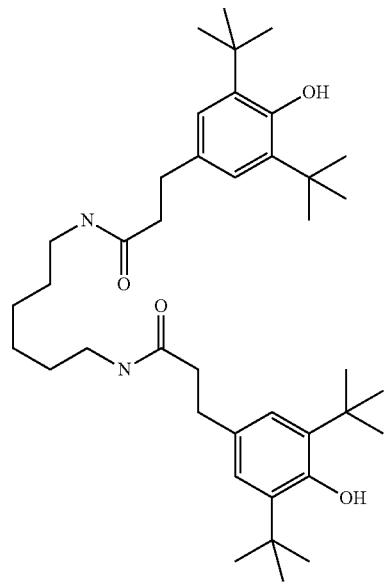 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
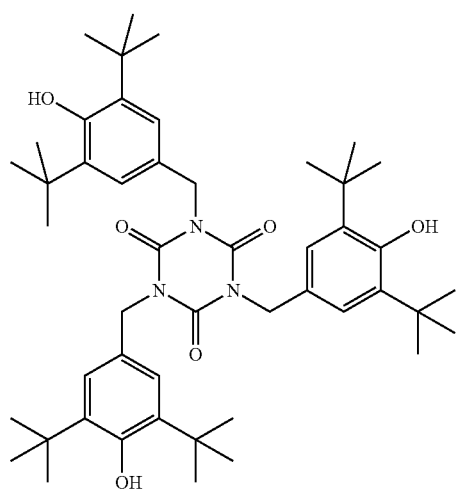 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE B-continued
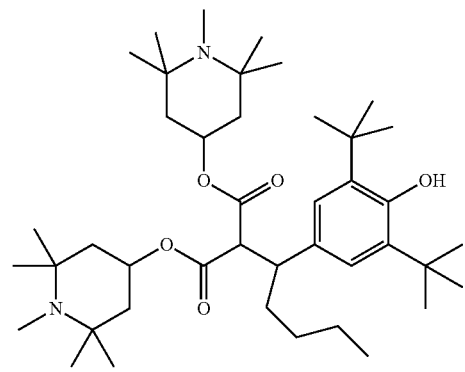 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
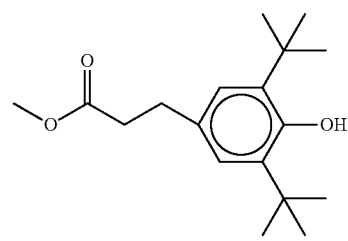
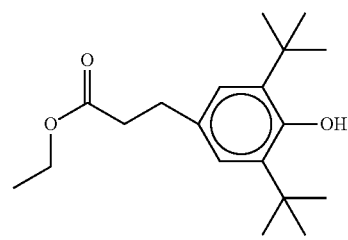
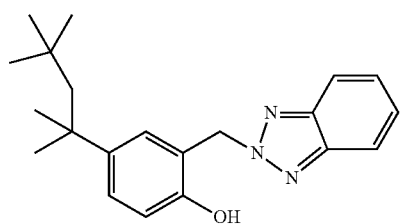 [SMILES: CC(C)(C)CC(C)(C)c1ccc(O)c(Cn2nc3ccccc3n2)c1]
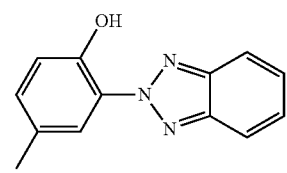 [SMILES: Cc1ccc(O)c(-n2nc3ccccc3n2)c1]
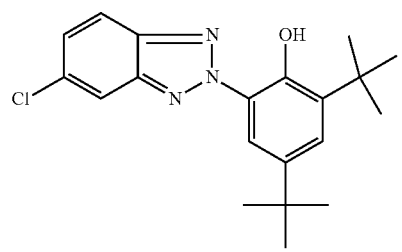 [SMILES: CC(C)(C)c1cc(-n2nc3ccc(Cl)cc3n2)c(O)c(C(C)(C)C)c1]

TABLE B-continued
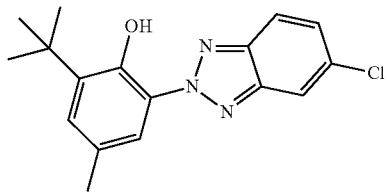 [SMILES: Cc1cc(-n2nc3ccc(Cl)cc3n2)c(O)c(C(C)(C)C)c1]
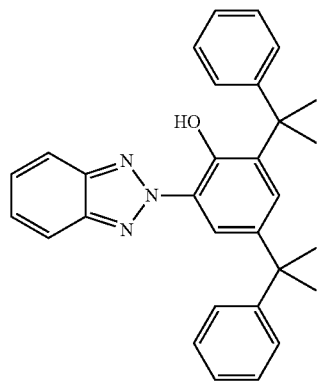 [SMILES: CC(C)(c1ccccc1)c1cc(-n2nc3ccccc3n2)c(O)c(C(C)(C)c2ccccc2)c1]
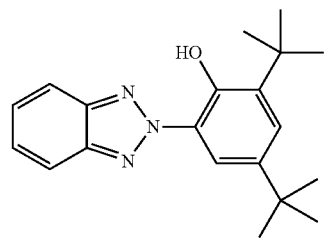 [SMILES: CC(C)(C)c1cc(-n2nc3ccccc3n2)c(O)c(C(C)(C)C)c1]
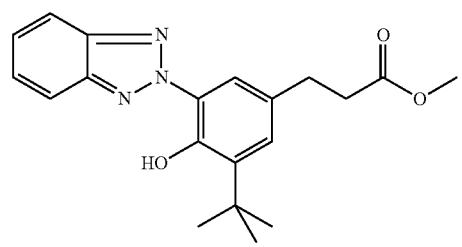 [SMILES: COC(=O)CCc1cc(-n2nc3ccccc3n2)c(O)c(C(C)(C)C)c1]
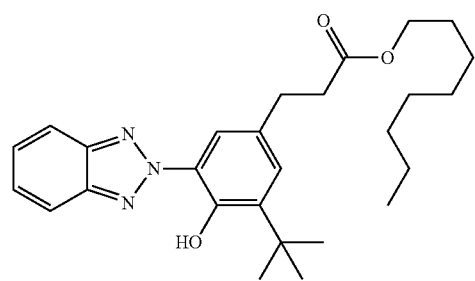 [SMILES: CCCCCCCCOC(=O)CCc1cc(-n2nc3ccccc3n2)c(O)c(C(C)(C)C)c1]

TABLE B-continued
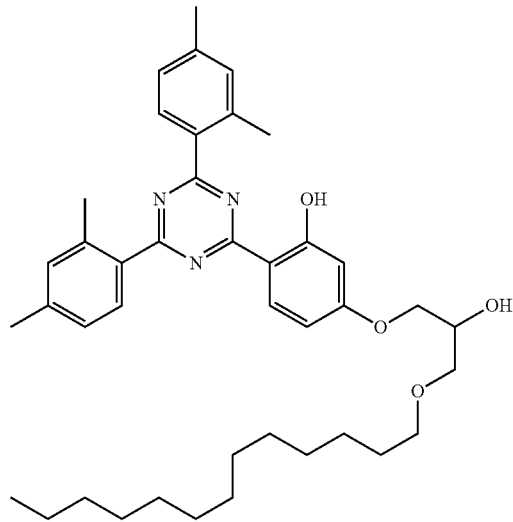 [SMILES: CCCCCCCCCCCCCOCC(O)COc1ccc(-c2nc(-c3ccc(C)cc3C)nc(-c3ccc(C)cc3C)n2)c(O)c1]
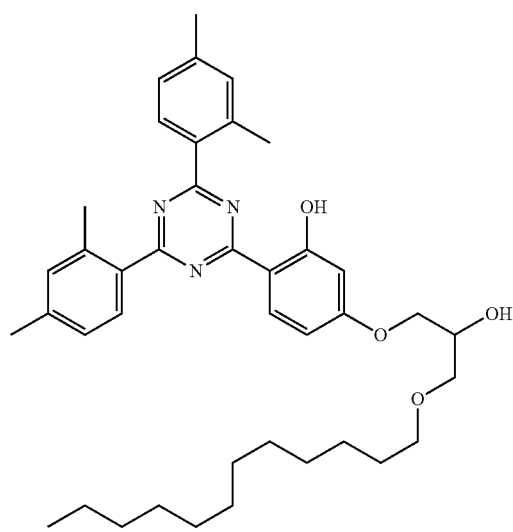 [SMILES: CCCCCCCCCCCCOCC(O)COc1ccc(-c2nc(-c3ccc(C)cc3C)nc(-c3ccc(C)cc3C)n2)c(O)c1]
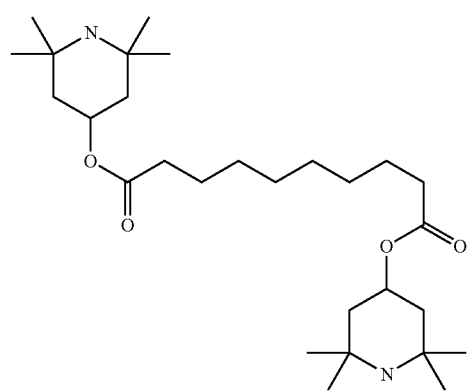

TABLE B-continued

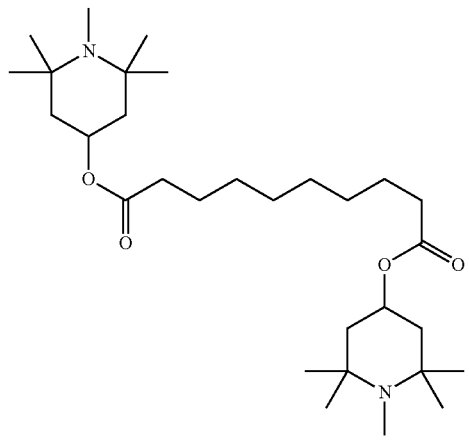

(n = 1-12)

The compositions consist of a plurality of compounds, preferably of 3 to 30, particularly preferably of 6 to 20 and very particularly preferably of 10 to 16 compounds, which are mixed in a conventional manner. In general, the desired amount of the components used in lesser amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures by other conventional methods, for example using premixes or from a so-called "multibottle system".

By means of suitable additives, the liquid-crystal phases according to the invention can be modified in such a way that they can be employed in any type of ECB, VAN, IPS, GH or ASM-PA LCD display known to date.

The following examples serve to illustrate the invention without restricting it. In the examples, the melting point T (C,N), the transition from the smectic (S) to the nematic (N) phase T (S,N) and clearing point T (N,I) of a liquid-crystal substance are Indicated in degrees Celsius.

Furthermore:

| | |
|---|---|
| $V_o$ | denotes the threshold voltage, capacitive [V] at 20° C. |
| Δn | denotes the optical anisotropy, measured at 20° C. and 589 nm |
| Δε | denotes the dielectric anisotropy at 20° C. and 1 kHz |
| cp. | denotes clearing point [° C.] |
| $γ_1$ | denotes rotational viscosity, measured at 20° C. [mPa · s] |
| LTS | denotes low-temperature stability, determined in test cells |
| HR (20) | denotes voltage holding ratio at 20° C. [%] |
| HR (100) | denotes voltage holding ratio after 5 min at 100° C. [%] |
| HR (UV) | denotes voltage holding ratio after UV exposure [%] |

In order to measure the voltage holding ratio, cells with an AI-3046 alignment layer are used.

The display for measurement of the threshold voltage has two plane-parallel outer plates at a separation of 20 μm and electrode layers with overlying SE-1211 (Nissan Chemicals) alignment layers on the insides of the outer plates, which effect a homeotropic alignment of the liquid crystals.

USE EXAMPLES

Example M1

| | | | |
|---|---|---|---|
| CY-3-O4 | 16.00% | Clearing point [° C.]: | 71.0 |
| CY-5-O2 | 13.00% | Δn [589 nm, 20° C.]: | 0.0822 |
| CCY-3-O2 | 14.00% | $ε_∥$ [kHz, 20° C.]: | 3.6 |
| CCY-2-1 | 13.00% | Δε [kHz, 20° C.]: | −3.3 |
| CCY-3-1 | 10.00% | $K_1$ [pN, 20° C.]: | 13.3 |
| CCH-35 | 10.00% | $K_3$ [pN, 20° C.]: | 14.0 |
| CCH-303 | 5.00% | $γ_1$ [mPa · s, 20° C.]: | 125 |
| CCH-301 | 12.00% | $V_0$ [V]: | 2.16 |
| BCH-32 | 7.00% | LTS: | nematic >1000 h at −30° C. |
| | | LTS: | nematic >350 h at −40° C. |
| | | HR (100): | 93.0% |

Example M2

| | | | |
|---|---|---|---|
| CY-3-O4 | 18.00% | Clearing point [° C.]: | 70.5 |
| CY-5-O4 | 14.00% | Δn [589 nm, 20° C.]: | 0.0825 |
| CCY-3-O2 | 5.00% | $ε_∥$ [kHz, 20° C.]: | 3.4 |
| CCY-5-O2 | 8.00% | Δε [kHz, 20° C.]: | −3.1 |
| CPY-2-O2 | 3.00% | $K_1$ [pN, 20° C.]: | 14.0 |
| CPY-3-O2 | 10.00% | $K_3$ [pN, 20° C.]: | 14.4 |
| CC-3-V1 | 12.00% | $γ_1$ [mPa · s, 20° C.]: | 102 |
| CC-5-V | 15.00% | $V_0$ [V]: | 2.27 |
| CC-3-2V | 10.00% | LTS: | nematic >1000 h at −40° C. |
| CCH-35 | 5.00% | | |
| | | HR (100): | 94.5% |

Example M3

| | | | |
|---|---|---|---|
| CY-3-O4 | 15.00% | Clearing point [° C.]: | 70.5 |
| CY-5-O5 | 15.00% | Δn [589 nm, 20° C.]: | 0.0952 |
| CCY-3-O2 | 10.00% | $ε_∥$ [kHz, 20° C.]: | 3.5 |
| CCY-3-1 | 10.00% | Δε [kHz, 20° C.]: | −3.1 |
| PCH-302 | 6.00% | $K_1$ [pN, 20° C.]: | 13.9 |
| CC-5-V | 6.00% | $K_3$ [pN, 20° C.]: | 14.6 |
| CC-3-V1 | 12.00% | $γ_1$ [mPa · s, 20° C.]: | 133 |
| CCH-35 | 5.00% | $V_0$ [V]: | 2.28 |
| CPY-2-1 | 7.00% | LTS: | nematic >1000 h |

-continued

| | | | |
|---|---|---|---|
| CPY-3-1 | 7.00% | | at −30° C. |
| CPY-5-1 | 7.00% | | |

| | | | |
|---|---|---|---|
| CY-3-O4 | 14.00% | Clearing point [° C.]: | 69.5 |
| CY-5-O2 | 8.00% | Δn [589 nm, 20° C.]: | 0.1005 |
| CY-5-O4 | 15.00% | $\varepsilon_\parallel$ [kHz, 20° C.]: | 3.6 |
| BCH-32 | 8.00% | Δε [kHz, 20° C.]: | −3.3 |
| CCP-V2-1 | 7.00% | $K_1$ [pN, 20° C.]: | 12.5 |
| CC-3-V1 | 8.00% | $K_3$ [pN, 20° C.]: | 13.5 |
| CC-3-V | 18.00% | $\gamma_1$ [mPa · s, 20° C.]: | 106 |
| CPY-2-O2 | 10.00% | $V_0$ [V]: | 2.14 |
| CPY-3-O2 | 12.00% | LTS: | nematic >1000 h at −40° C. |

Example M5

| | | | |
|---|---|---|---|
| CY-3-O4 | 15.00% | Clearing point [° C.]: | 73.5 |
| CY-5-O4 | 13.00% | Δn [589 nm, 20° C.]: | 0.1198 |
| PCH-53 | 5.00% | $\varepsilon_\parallel$ [kHz, 20° C.]: | 3.7 |
| CCP-V-1 | 6.00% | Δε [kHz, 20° C.]: | −3.3 |
| BCH-32 | 8.00% | $K_1$ [pN, 20° C.]: | 11.9 |
| CC-3-V1 | 8.00% | $K_3$ [pN, 20° C.]: | 12.0 |
| CC-5-V | 9.00% | $\gamma_1$ [mPa · s, 20° C.]: | 150 |
| CPY-2-O2 | 12.00% | $V_0$ [V]: | 2.01 |
| CPY-3-O2 | 12.00% | | |
| YPY-4-1 | 6.00% | | |
| YPY-4-4 | 6.00% | | |

Example M6

| | | | |
|---|---|---|---|
| CY-3-O4 | 11.00% | Clearing point [° C.]: | 71.0 |
| CY-5-O2 | 11.00% | Δn [589 nm, 20° C.]: | 0.1202 |
| CPY-2-O2 | 12.00% | $\varepsilon_\parallel$ [kHz, 20° C.]: | 3.7 |
| CPY-3-O2 | 9.00% | Δε [kHz, 20° C.]: | −3.0 |
| BCH-32 | 9.00% | $K_1$ [20° C.]: | 12.4 |
| CCH-301 | 12.00% | $K_3$ [20° C.]: | 11.7 |
| CCH-303 | 12.00% | $\gamma_1$ [mPa · s, 20° C.]: | 125 |
| CCH-35 | 6.00% | $V_0$ [V]: | 2.10 |
| PYP-2-3 | 6.00% | LTS: | nematic >1000 h at −30° C. |
| PYP-2-4 | 12.00% | | |

Example M7

| | | | |
|---|---|---|---|
| CY-3-O4 | 20.00% | Clearing point [° C.]: | 70.0 |
| CY-5-O4 | 5.00% | Δn [589 nm, 20° C.]: | 0.1201 |
| CPY-2-O2 | 12.00% | $\varepsilon_\parallel$ [kHz, 20° C.]: | 3.6 |
| CPY-3-O2 | 12.00% | Δε [kHz, 20° C.]: | −3.2 |
| PYP-2-3 | 10.00% | $K_1$ [20° C.]: | 11.7 |
| PYP-2-4 | 10.00% | $K_3$ [20° C.]: | 12.4 |
| CC-3-V1 | 12.00% | $\gamma_1$ [mPa · s, 20° C.]: | 116 |
| CC-4-V | 14.00% | $V_0$ [V]: | 2.09 |
| CCH-34 | 5.00% | | |

Example M8

| | | | |
|---|---|---|---|
| BCH-32 | 10.00% | Clearing point [° C.]: | 72.0 |
| CCP-V-1 | 10.00% | Δn [589 nm, 20° C.]: | 0.1512 |
| CC-3-V1 | 12.00% | $\varepsilon_\parallel$ [kHz, 20° C.]: | 3.7 |
| CPY-2-O2 | 12.00% | Δε [kHz, 20° C.]: | −3.6 |
| CPY-3-O2 | 13.00% | $K_1$ [20° C.]: | 15.0 |
| B-302FF | 19.00% | $K_3$ [20° C.]: | 15.5 |
| B-502FF | 17.00% | $\gamma_1$ [mPa · s, 20° C.]: | 143 |
| PP-1-4 | 7.00% | $V_0$ [V]: | 2.20 |
| | | LTS: | nematic >1000 h at −30° C. |

Example M9

| | | | |
|---|---|---|---|
| CY-3-O2 | 18.00% | Clearing point [° C.]: | 71.0 |
| CY-3-O4 | 5.00% | Δn [589 nm, 20° C.]: | 0.0821 |
| CY-5-O2 | 12.00% | $\varepsilon_\parallel$ [kHz, 20° C.]: | 3.7 |
| CCY-3-O2 | 12.00% | Δε [kHz, 20° C.]: | −3.9 |
| CCY-5-O2 | 3.00% | $K_1$ [20° C.]: | 13.1 |
| CCY-2-1 | 4.00% | $K_3$ [20° C.]: | 14.9 |
| CCY-3-1 | 8.00% | $\gamma_1$ [mPa · s, 20° C.]: | 130 |
| CPY-3-O2 | 3.00% | $V_0$ [V]: | 2.07 |
| CCH-35 | 5.00% | LTS: | nematic >1000 h at −40° C. |
| PCH-302 | 8.00% | | |
| CH-33 | 3.00% | HR (100° C.): | 93% |
| CH-43 | 4.00% | | |
| CC-5-V | 15.00% | | |

Example M10

| | | | |
|---|---|---|---|
| CY-3-O4 | 9.00% | Clearing point [° C.]: | 69.0 |
| CY-5-O2 | 14.00% | Δn [589 nm, 20° C.]: | 0.0813 |
| CY-5-O4 | 16.00% | $\varepsilon_\parallel$ [kHz, 20° C.]: | 3.7 |
| CCY-3-O2 | 11.00% | Δε [kHz, 20° C.]: | −4.2 |
| CCH-35 | 6.00% | $K_1$ [20° C.]: | 13.1 |
| CC-3-V1 | 7.00% | $K_3$ [20° C.]: | 14.1 |
| CC-5-V | 18.00% | $\gamma_1$ [mPa · s, 20° C.]: | 116 |
| CPY-3-O2 | 4.00% | $V_0$ [V]: | 1.94 |
| CCY-V-O2 | 15.00% | LTS: | nematic >1000 h at −30° C. |
| | | LTS: | nematic >600 h at −40° C. |
| | | HR (100° C.): | 94% |

Example M11

| | | | |
|---|---|---|---|
| CY-3-O4 | 17.00% | Clearing point [° C.]: | 70.5 |
| CY-5-O2 | 9.00% | Δn [589 nm, 20° C.]: | 0.0993 |
| CY-5-O4 | 14.00% | $\varepsilon_\parallel$ [kHz, 20° C.]: | 4.0 |
| CPY-2-O2 | 7.00% | Δε [kHz, 20° C.]: | −4.2 |
| CPY-3-O2 | 7.00% | $K_1$ [20° C.]: | 11.5 |
| CCP-V-1 | 12.00% | $K_3$ [20° C.]: | 14.3 |
| CCH-35 | 5.00% | $\gamma_1$ [mPa · s, 20° C.]: | 187 |
| CC-3-V1 | 9.00% | $V_0$ [V]: | 1.95 |
| CPQIY-3-O4 | 10.00% | LTS: | nematic >1000 h at −30° C. |
| CPQIY-5-O4 | 10.00% | | |

Example M12

| | | | |
|---|---|---|---|
| CC-5-V | 11.00% | Clearing point [° C.]: | 73.0 |
| PCH-53 | 13.00% | Δn [589 nm, 20° C.]: | 0.0985 |
| CY-3-O4 | 12.00% | $\varepsilon_\parallel$ [kHz, 20° C.]: | 3.7 |
| CY-5-O4 | 12.00% | Δε [kHz, 20° C.]: | −4.0 |

-continued

| | | | |
|---|---|---|---|
| CCY-2-O2 | 12.00% | $K_1$ [20° C.]: | 13.8 |
| CCY-3-O2 | 12.00% | $K_3$ [20° C.]: | 14.2 |
| CCY-5-O2 | 8.00% | $\gamma_1$ [mPa·s, 20° C.]: | 163 |
| CCY-2-1 | 10.00% | $V_0$ [V]: | 1.98 |
| PYP-2-3 | 10.00% | | |

Example M13

| | | | |
|---|---|---|---|
| CY-3-O4 | 16.00% | Clearing point [° C.]: | 71.0 |
| CY-5-O4 | 15.00% | $\Delta n$ [589 nm, 20° C.]: | 0.1014 |
| CY-5-O2 | 8.00% | $\varepsilon_\parallel$ [kHz, 20° C.]: | 3.8 |
| CCY-3-O2 | 6.00% | $\Delta\varepsilon$ [kHz, 20° C.]: | −4.0 |
| BCH-32 | 7.00% | $K_1$ [20° C.]: | 13.9 |
| CCH-35 | 5.00% | $K_3$ [20° C.]: | 13.0 |
| CC-3-2V | 10.00% | $\gamma_1$ [mPa·s, 20° C.]: | 141 |
| CC-5-V | 9.00% | $V_0$ [V]: | 1.89 |
| CPY-2-O2 | 12.00% | LTS: | nematic >1000 h at −30° C. |
| CPY-3-O2 | 12.00% | | |

Example M14

| | | | |
|---|---|---|---|
| CY-3-O4 | 20.00% | Clearing point [° C.]: | 73.5 |
| CY-5-O2 | 9.00% | $\Delta n$ [589 nm, 20° C.]: | 0.1202 |
| CY-5-O4 | 4.00% | $\varepsilon_\parallel$ [kHz, 20° C.]: | 3.7 |
| BCH-32 | 10.00% | $\Delta\varepsilon$ [kHz, 20° C.]: | −3.8 |
| PGIGI-3-F | 2.00% | $K_1$ [20° C.]: | 13.0 |
| CC-3-V1 | 11.00% | $K_3$ [20° C.]: | 13.1 |
| CC-5-V | 10.00% | $\gamma_1$ [mPa·s, 20° C.]: | 153 |
| CPY-2-O2 | 14.00% | $V_0$ [V]: | 1.95 |
| CPY-3-O2 | 12.00% | LTS: | nematic >1000 h at −20° C. |
| YPY-4-1 | 2.00% | | |
| YPY-4-4 | 2.00% | | |
| YPY-5-5 | 2.00% | | |
| YPY-4-2V | 2.00% | | |

Example M15

| | | | |
|---|---|---|---|
| CY-3-O4 | 16.00% | Clearing point [° C.]: | 69.0 |
| CY-5-O2 | 8.00% | $\Delta n$ [589 nm, 20° C.]: | 0.1249 |
| CY-5-O4 | 16.00% | $\varepsilon_\parallel$ [kHz, 20° C.]: | 3.9 |
| BCH-32 | 8.00% | $\Delta\varepsilon$ [kHz, 20° C.]: | −4.1 |
| CC-5-V | 8.00% | $K_1$ [20° C.]: | 12.7 |
| CC-3-V1 | 8.00% | $K_3$ [20° C.]: | 13.1 |
| CPY-2-O2 | 11.00% | $\gamma_1$ [mPa·s, 20° C.]: | 153 |
| CPY-3-O2 | 11.00% | $V_0$ [V]: | 1.89 |
| PYP-2-3 | 14.00% | LTS: | nematic >1000 h at −40° C. |

Example M16

| | | | |
|---|---|---|---|
| CY-3-O4 | 20.00% | Clearing point [° C.]: | 71.0 |
| CY-5-O2 | 8.00% | $\Delta n$ [589 nm, 20° C.]: | 0.1210 |
| CY-5-O4 | 12.00% | $\varepsilon_\parallel$ [kHz, 20° C.]: | 4.0 |
| BCH-32 | 9.00% | $\Delta\varepsilon$ [kHz, 20° C.]: | −4.1 |
| CCP-V-1 | 7.00% | $K_1$ [20° C.]: | 12.4 |
| PGIGI-3-F | 7.00% | $K_3$ [20° C.]: | 13.8 |
| CC-3-V1 | 8.00% | $\gamma_1$ [mPa·s, 20° C.]: | 171 |
| PCH-53 | 3.00% | $V_0$ [V]: | 1.94 |
| CPY-2-O2 | 14.00% | LTS: | nematic >1000 h at −30° C. |
| CPY-3-O2 | 12.00% | | |

-continued

| | | | |
|---|---|---|---|
| | | LTS: | nematic >600 h at −40° C. |

Example M17

| | | | |
|---|---|---|---|
| CY-3-O4 | 16.00% | Clearing point [° C.]: | 68.5 |
| CY-5-O2 | 8.00% | $\Delta n$ [589 nm, 20° C.]: | 0.1515 |
| BCH-32 | 8.00% | $\varepsilon_\parallel$ [kHz, 20° C.]: | 4.2 |
| CC-3-V1 | 10.00% | $\Delta\varepsilon$ [kHz, 20° C.]: | −4.0 |
| CPY-2-O2 | 12.00% | $K_1$ [20° C.]: | 13.0 |
| CPY-3-O2 | 12.00% | $K_3$ [20° C.]: | 14.4 |
| PYP-2-3 | 11.00% | $\gamma_1$ [mPa·s, 20° C.]: | 161 |
| PYP-3-3 | 10.00% | $V_0$ [V]: | 2.01 |
| B-11FF | 13.00% | LTS: | nematic >1000 h at −40° C. |

Example M18

| | | | |
|---|---|---|---|
| CC-5-V | 7.00% | Clearing point [° C.]: | 70.0 |
| CCH-34 | 6.00% | $\Delta n$ [589 nm, 20° C.]: | 0.0796 |
| CY-3-O4 | 22.00% | $\varepsilon_\parallel$ [kHz, 20° C.]: | 4.0 |
| CY-5-O4 | 21.00% | $\Delta\varepsilon$ [kHz, 20° C.]: | −4.8 |
| CCY-2-O2 | 8.00% | $K_1$ [20° C.]: | 12.9 |
| CCY-3-O2 | 6.00% | $K_3$ [20° C.]: | 12.6 |
| CCY-5-O2 | 7.00% | $\gamma_1$ [mPa·s, 20° C.]: | 172 |
| CCY-2-1 | 10.00% | $V_0$ [V]: | 1.72 |
| CCY-3-1 | 8.00% | LTS: | nematic >1000 h at −40° C. |
| CH-33 | 2.00% | | |
| CH-43 | 3.00% | | |

Example M19

| | | | |
|---|---|---|---|
| CC-5-V | 13.00% | Clearing point [° C.]: | 73.0 |
| CY-3-O4 | 20.00% | $\Delta n$ [589 nm, 20° C.]: | 0.0830 |
| CY-5-O4 | 20.00% | $\varepsilon_\parallel$ [kHz, 20° C.]: | 3.9 |
| CCY-2-O2 | 8.00% | $\Delta\varepsilon$ [kHz, 20° C.]: | −5.1 |
| CCY-3-O2 | 11.00% | $K_1$ [20° C.]: | 13.2 |
| CCY-5-O2 | 8.00% | $K_3$ [20° C.]: | 14.0 |
| CCY-2-1 | 10.00% | $\gamma_1$ [mPa·s, 20° C.]: | 184 |
| CCY-3-1 | 10.00% | $V_0$ [V]: | 1.76 |
| | | LTS: | nematic >1000 h at −20° C. |
| | | LTS: | nematic >800 h at −30° C. |

Example M20

| | | | |
|---|---|---|---|
| PCH-53 | 5.00% | Clearing point [° C.]: | 70.5 |
| CY-3-O4 | 22.00% | $\Delta n$ [589 nm, 20° C.]: | 0.0951 |
| CY-5-O4 | 20.00% | $\varepsilon_\parallel$ [kHz, 20° C.]: | 4.1 |
| CCY-2-O2 | 9.00% | $\Delta\varepsilon$ [kHz, 20° C.]: | −4.9 |
| CCY-3-O2 | 10.00% | $K_1$ [20° C.]: | 12.9 |
| CCY-5-O2 | 5.00% | $K_3$ [20° C.]: | 13.2 |
| CCY-2-1 | 12.00% | $\gamma_1$ [mPa·s, 20° C.]: | 210 |
| CCY-3-1 | 8.00% | $V_0$ [V]: | 1.73 |
| BCH-32 | 4.00% | LTS: | nematic >1000 h at −40° C. |
| BCH-52 | 4.00% | | |
| PGIGI-3-F | 1.00% | | |

Example M21

| | | | |
|---|---|---|---|
| CY-3-O4 | 16.00% | Clearing point [° C.]: | 70.0 |
| CY-5-O2 | 16.00% | Δn [589 nm, 20° C.]: | 0.1019 |
| CY-5-O4 | 13.00% | $\varepsilon_\parallel$ [kHz, 20° C.]: | 4.0 |
| CCY-3-O2 | 9.00% | Δε [kHz, 20° C.]: | −5.0 |
| CPY-2-O2 | 12.00% | $K_1$ [20° C.]: | 13.8 |
| CPY-3-O2 | 12.00% | $K_3$ [20° C.]: | 14.5 |
| CC-3-V1 | 10.00% | $\gamma_1$ [mPa · s, 20° C.]: | 165 |
| CCH-35 | 9.00% | $V_0$ [V]: | 1.79 |
| BCH-32 | 3.00% | | |

Example M22

| | | | |
|---|---|---|---|
| CCY-3-O2 | 15.00% | Clearing point [° C.]: | 87.0 |
| CCY-5-O2 | 12.00% | Δn [589 nm, 20° C.]: | 0.0797 |
| CCY-2-1 | 6.00% | $\varepsilon_\parallel$ [kHz, 20° C.]: | 3.2 |
| CCY-3-1 | 13.00% | Δε [kHz, 20° C.]: | −3.1 |
| CY-5-O2 | 17.00% | $K_1$ [20° C.]: | 17.0 |
| CCH-301 | 7.00% | $K_3$ [20° C.]: | 17.8 |
| CCH-35 | 20.00% | $\gamma_1$ [mPa · s, 20° C.]: | 147 |
| PCH-53 | 10.00% | $V_0$ [V]: | 2.53 |

Example M23

| | | | |
|---|---|---|---|
| BCH-32F | 2.50% | Clearing point [° C.]: | 92.0 |
| CCH-301 | 16.50% | Δn [589 nm, 20° C.]: | 0.0827 |
| CCH-34 | 5.00% | $\varepsilon_\parallel$ [kHz, 20° C.]: | 3.4 |
| CCH-35 | 5.00% | Δε [kHz, 20° C.]: | −3.0 |
| CCY-2-1 | 14.00% | $K_1$ [20° C.]: | 16.4 |
| CCY-3-O2 | 13.50% | $K_3$ [20° C.]: | 17.8 |
| CCY-3-1 | 14.00% | $\gamma_1$ [mPa · s, 20° C.]: | 154 |
| CCY-5-O2 | 13.50% | $V_0$ [V]: | 2.58 |
| PCH-301 | 8.50% | | |
| CY-3-O2 | 7.50% | | |

Example M24

| | | | |
|---|---|---|---|
| CY-3-O4 | 8.00% | Clearing point [° C.]: | 91.0 |
| CY-5-O2 | 3.00% | Δn [589 nm, 20° C.]: | 0.0822 |
| CCY-3-O2 | 11.00% | $\varepsilon_\parallel$ [kHz, 20° C.]: | 3.3 |
| CCY-3-O3 | 12.00% | Δε [kHz, 20° C.]: | −3.2 |
| CCY-4-O2 | 12.00% | $K_1$ [20° C.]: | 15.4 |
| CPY-2-O2 | 10.00% | $K_3$ [20° C.]: | 15.9 |
| CC-4-V | 17.00% | $\gamma_1$ [mPa · s, 20° C.]: | 117 |
| CC-3-V1 | 12.00% | $V_0$ [V]: | 2.36 |
| CCH-35 | 4.00% | LTS: | nematic >1000 h at −20° C. |
| CCH-301 | 11.00% | | |

Example M25

| | | | |
|---|---|---|---|
| CY-3-O4 | 12.00% | Clearing point [° C.]: | 90.0 |
| CCY-3-O3 | 12.00% | Δn [589 nm, 20° C.]: | 0.1019 |
| CCY-4-O2 | 2.00% | $\varepsilon_\parallel$ [kHz, 20° C.]: | 3.4 |
| CPY-2-O2 | 12.00% | Δε [kHz, 20° C.]: | −3.0 |
| CPY-3-O2 | 12.00% | $K_1$ [20° C.]: | 15.2 |
| CCH-301 | 11.00% | $K_3$ [20° C.]: | 15.8 |
| CC-5-V | 20.00% | $\gamma_1$ [mPa · s, 20° C.]: | 135 |
| CC-3-V1 | 10.00% | $V_0$ [V]: | 2.43 |
| PYP-2-3 | 2.00% | | |
| PYP-2-4 | 4.00% | | |
| CCPC-33 | 3.00% | | |

Example M26

| | | | |
|---|---|---|---|
| CY-3-O4 | 15.00% | Clearing point [° C.]: | 90.5 |
| CY-5-O4 | 11.00% | Δn [589 nm, 20° C.]: | 0.1249 |
| CY-5-O2 | 5.00% | $\varepsilon_\parallel$ [kHz, 20° C.]: | 3.7 |
| CPY-2-O2 | 12.00% | Δε [kHz, 20° C.]: | −3.3 |
| CPY-3-O2 | 12.00% | $K_1$ [20° C.]: | 15.2 |
| BCH-32 | 8.00% | $K_3$ [20° C.]: | 15.6 |
| PGIGI-3-F | 8.00% | $\gamma_1$ [mPa · s, 20° C.]: | 188 |
| CCP-V-1 | 8.00% | $V_0$ [V]: | 2.38 |
| CCP-V2-1 | 8.00% | LTS: | nematic >1000 h at −30° C. |
| CC-5-V | 9.00% | HR (100° C.): | 94% |
| CC-3-V1 | 2.00% | | |
| CBC-33 | 2.00% | | |

Example M27

| | | | |
|---|---|---|---|
| CY-3-O2 | 12.00% | Clearing point [° C.]: | 91.0 |
| CY-5-O2 | 11.00% | Δn [589 nm, 20° C.]: | 0.0829 |
| CCY-3-O2 | 14.00% | $\varepsilon_\parallel$ [kHz, 20° C.]: | 3.6 |
| CCY-5-O2 | 15.00% | Δε [kHz, 20° C.]: | −4.2 |
| CCY-2-1 | 10.00% | $K_1$ [20° C.]: | 16.6 |
| CCY-3-1 | 14.00% | $K_3$ [20° C.]: | 18.4 |
| CCH-34 | 6.00% | $\gamma_1$ [mPa · s, 20° C.]: | 185 |
| CCH-35 | 5.00% | | |
| CCH-301 | 4.00% | | |
| CCH-303 | 5.00% | | |
| CCH-501 | 4.00% | | |

Example M28

| | | | |
|---|---|---|---|
| CY-3-O2 | 20.00% | Clearing point [° C.]: | 91.0 |
| CY-5-O2 | 5.00% | Δn [589 nm, 20° C.]: | 0.0821 |
| CCY-3-O2 | 12.00% | $\varepsilon_\parallel$ [kHz, 20° C.]: | 3.5 |
| CCY-5-O2 | 7.00% | Δε [kHz, 20° C.]: | −4.1 |
| CCY-3-O3 | 12.00% | $K_1$ [20° C.]: | 16.2 |
| CCY-4-O2 | 11.00% | $K_3$ [20° C.]: | 18.1 |
| CC-5-V | 20.00% | $\gamma_1$ [mPa · s, 20° C.]: | 148 |
| CC-3-V1 | 9.00% | $V_0$ [V]: | 2.21 |
| CCH-35 | 4.00% | LTS: | nematic >1000 h at −20° C. |

Example M29

| | | | |
|---|---|---|---|
| CY-5-O2 | 9.00% | Clearing point [° C.]: | 90.5 |
| CY-5-O4 | 15.00% | Δn [589 nm, 20° C.]: | 0.1023 |
| CCY-3-O3 | 12.00% | $\varepsilon_\parallel$ [kHz, 20° C.]: | 3.5 |
| CCY-4-O2 | 10.00% | Δε [kHz, 20° C.]: | −4.1 |
| CCY-5-O2 | 10.00% | $K_1$ [20° C.]: | 17.3 |
| CPY-2-O2 | 2.00% | $K_3$ [20° C.]: | 16.4 |
| CPY-3-O2 | 12.00% | $\gamma_1$ [mPa · s, 20° C.]: | 211 |
| CCH-35 | 7.00% | $V_0$ [V]: | 2.10 |
| CCH-303 | 4.00% | LTS: | nematic >1000 h at −20° C. |
| PCH-53 | 12.00% | | |
| BCH-32 | 7.00% | HR (100° C.): | 91% |

Example M30

| | | | |
|---|---|---|---|
| CY-3-O4 | 5.00% | Clearing point [° C.]: | 91.5 |
| CY-5-O4 | 20.00% | Δn [589 nm, 20° C.]: | 0.1015 |
| CCY-3-O3 | 12.00% | $\varepsilon_\parallel$ [kHz, 20° C.]: | 3.5 |
| CCY-4-O2 | 10.00% | Δε [kHz, 20° C.]: | −4.2 |
| CCY-5-O2 | 11.00% | $K_1$ [20° C.]: | 16.6 |
| CPY-3-O2 | 10.00% | $K_3$ [20° C.]: | 16.3 |
| PYP-2-4 | 7.00% | $\gamma_1$ [mPa·s, 20° C.]: | 211 |
| CC-3-V1 | 11.00% | $V_0$ [V]: | 2.10 |
| CC-5-V | 11.00% | LTS: | nematic >1000 h at −20° C. |
| PCH-53 | 3.00% | HR (100° C.): | 94% |

Example M31

| | | | |
|---|---|---|---|
| CY-3-O4 | 14.00% | Clearing point [° C.]: | 90.0 |
| CY-5-O2 | 14.00% | Δn [589 nm, 20° C.]: | 0.1168 |
| CY-5-O4 | 4.00% | $\varepsilon_\parallel$ [kHz, 20° C.]: | 3.7 |
| CCY-3-O2 | 6.00% | Δε [kHz, 20° C.]: | −4.2 |
| CCY-5-O2 | 7.00% | $K_1$ [20° C.]: | 15.3 |
| PGIGI-3-F | 2.00% | $K_3$ [20° C.]: | 17.7 |
| BCH-32 | 10.00% | $\gamma_1$ [mPa·s, 20° C.]: | 198 |
| CPY-2-O2 | 10.00% | $V_0$ [V]: | 2.15 |
| CPY-3-O2 | 14.00% | | |
| CCP-V-1 | 2.00% | | |
| CC-5-V | 5.00% | | |
| CC-3-V1 | 12.00% | | |

Example M32

| | | | |
|---|---|---|---|
| CY-3-O4 | 20.00% | Clearing point [° C.]: | 87.0 |
| CY-5-O2 | 12.00% | Δn [589 nm, 20° C.]: | 0.0808 |
| CY-5-O4 | 20.00% | $\varepsilon_\parallel$ [kHz, 20° C.]: | 3.9 |
| CCY-3-O2 | 7.00% | Δε [kHz, 20° C.]: | −5.0 |
| CCY-5-O2 | 11.00% | $K_1$ [20° C.]: | 13.6 |
| CCH-301 | 5.00% | $K_3$ [20° C.]: | 15.1 |
| CH-33 | 4.00% | $\gamma_1$ [mPa·s, 20° C.]: | 265 |
| CH-35 | 4.00% | $V_0$ [V]: | 1.82 |
| CH-43 | 4.00% | | |
| CH-45 | 4.00% | | |
| CCPC-33 | 3.00% | | |
| CCPC-34 | 3.00% | | |
| CCPC-35 | 3.00% | | |

Example M33

| | | | |
|---|---|---|---|
| CY-3-O4 | 14.00% | Clearing point [° C.]: | 86.0 |
| CY-5-O2 | 10.00% | Δn [589 nm, 20° C.]: | 0.1023 |
| CY-5-O4 | 16.00% | $\varepsilon_\parallel$ [kHz, 20° C.]: | 3.9 |
| CCY-2-O2 | 6.00% | Δε [kHz, 20° C.]: | −5.1 |
| CCY-3-O2 | 12.00% | $K_1$ [20° C.]: | 15.2 |
| CCY-5-O2 | 8.00% | $K_3$ [20° C.]: | 16.2 |
| CCY-2-1 | 8.00% | $\gamma_1$ [mPa·s, 20° C.]: | 257 |
| CCY-3-1 | 12.00% | $V_0$ [V]: | 1.89 |
| BCH-32 | 8.00% | LTS: | nematic >1000 h at −20° C. |
| CCP-V-1 | 4.00% | | |
| PGIGI-3-F | 2.00% | LTS: | nematic >760 h at −30° C. |
| | | LTS: | nematic >500 h at −40° C. |
| | | HR (20° C.): | 98% |
| | | HR (100° C.): | 91% |

Example M34

| | | | |
|---|---|---|---|
| CY-3-O4 | 10.00% | Clearing point [° C.]: | 90.0 |
| CY-5-O4 | 14.00% | Δn [589 nm, 20° C.]: | 0.1204 |
| CY-5-O2 | 13.00% | $\varepsilon_\parallel$ [kHz, 20° C.]: | 3.9 |
| CCY-3-O2 | 14.00% | Δε [kHz, 20° C.]: | −5.0 |
| CCY-5-O2 | 1.00% | $K_1$ [20° C.]: | 14.7 |
| CBC-33 | 6.00% | $K_3$ [20° C.]: | 16.8 |
| CC-5-V | 11.00% | $\gamma_1$ [mPa·s, 20° C.]: | 265 |
| PGIGI-3-F | 7.00% | $V_0$ [V]: | 1.94 |
| CPY-2-O2 | 12.00% | LTS: | nematic >1000 h at −40° C. |
| CPY-3-O2 | 12.00% | | |

Example M35

| | | | |
|---|---|---|---|
| CY-3-O2 | 13.00% | Clearing point [° C.]: | 79.5 |
| CY-5-O2 | 5.00% | Δn [589 nm, 20° C.]: | 0.0788 |
| CCY-4-O2 | 10.00% | $\varepsilon_\parallel$ [kHz, 20° C.]: | 3.4 |
| CCY-3-O3 | 12.00% | Δε [kHz, 20° C.]: | −3.1 |
| CCY-2-O2V | 11.00% | $K_1$ [pN, 20° C.]: | 13.9 |
| CPY-2-O2 | 6.00% | $K_3$ [pN, 20° C.]: | 13.6 |
| CCH-303 | 5.00% | $\gamma_1$ [mPa·s, 20° C.]: | 107 |
| CC-5-V | 18.00% | $V_0$ [V]: | 2.21 |
| CC-3-V1 | 12.00% | | |
| CCH-34 | 5.00% | | |
| PCH-301 | 3.00% | | |

The invention claimed is:

1. A liquid-crystalline medium comprising a mixture of polar compounds having negative dielectric anisotropy (Δε), which has a value for the ratio $\gamma_1/\Delta n^2$ in the range 6-45 Pa·s, wherein $\gamma_1$ is rotational viscosity and Δn is optical anisotropy, with a clearing point of >60° C. and a Δε of ≤−2.3, which are one or more compounds of formula B-1, B-2 or B-4

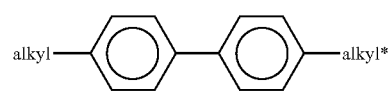

B-1

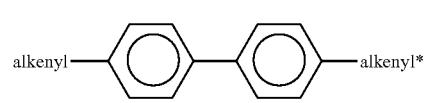

B-2

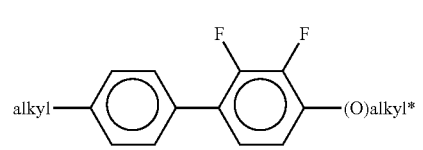

B-4 at least one compound of formula IB,

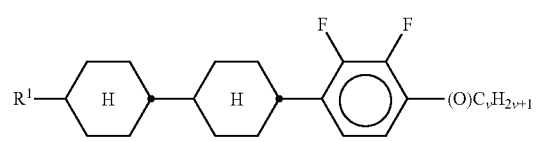

IB and at least one compound of formula II

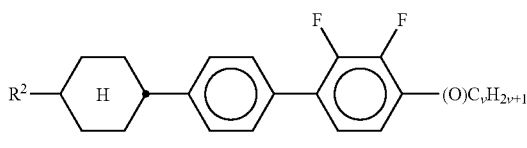

in which
- alkyl and alkyl* each, independently of one another, denote a straight-chain alkyl radical having 1-6 C atoms,
- alkenyl and alkenyl* each, independently of one another, denote a straight-chain alkenyl radical having 2-6 C atoms,
- $R^1$ and $R^2$ each, independently of one another, denote H, an alkyl or alkenyl radical having up to 15 C atoms which is unsubstituted, monosubstituted by CN or $CF_3$ or at least monosubstituted by halogen, in which one or more $CH_2$ groups are optionally replaced by —O—, —S—,

—C≡C—, —OCF$_2$—, —CF$_2$O—, —OC—O— or —O—CO— in such a way that O atoms are not linked directly to one another, and
v denotes 1 to 6.

2. A liquid-crystalline medium according to claim 1, which has a clearing point of 60-90° C.

3. A liquid-crystalline medium according to claim 1, which has a Δε value of −2.3 to −5.5.

4. A liquid-crystalline medium according to claim 1, which has a clearing point of 70° C.±5° C. and a Δε of −3.0±0.6 and has the following rotational viscosities γ$_1$ at a defined Δn value:

| Δn | γ$_1$ |
|---|---|
| 0.08 ± 0.005 | ≤125 mPa · s |
| 0.09 ± 0.005 | ≤130 mPa · s |
| 0.10 ± 0.005 | ≤135 mPa · s |
| 0.11 ± 0.005 | ≤145 mPa · s |
| 0.12 ± 0.005 | ≤150 mPa · s |
| 0.13 ± 0.005 | ≤160 mPa · s |
| 0.15 ± 0.01 | ≤170 mPa · s. |

5. A liquid-crystalline medium according to claim 1, which has thresholds (capacitive) in the range 1.8-2.3 V.

6. A liquid-crystalline medium according to claim 1, which further comprises a compound of formula IA

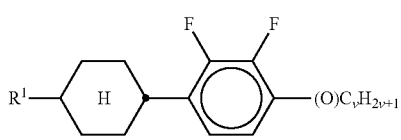

in which
- $R^1$ denotes H, an alkyl or alkenyl radical having up to 15 C atoms which is unsubstituted, monosubstituted by CN or $CF_3$ or at least monosubstituted by halogen, in which one or more $CH_2$ groups are each, independently of one another, optionally replaced by —O—, —S—,

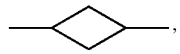

—C≡C—, —CF$_2$O—, —CO—, —CO—O—, —O—CO— or —O—CO—O— in such a way that O atoms are not linked directly to one another, and
v denotes 1 to 6.

7. A liquid-crystalline medium according to claim 1, which additionally comprises one or more compounds of the formula III

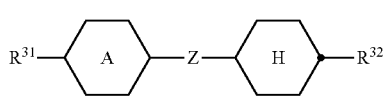

in which
- $R^{31}$ and $R^{32}$ each, independently of one another, denote a straight-chain alkyl, alkylalkoxy or alkoxy radical having up to 12 C atoms, and

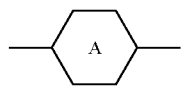

denotes

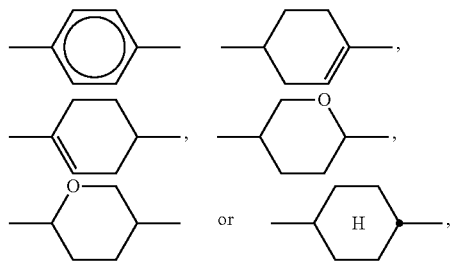

and
- Z denotes a single bond, —C$_2$H$_4$—, —CH═CH—, —(CH$_2$)$_4$—, —(CH$_2$)$_3$O—, —O(CH$_2$)$_3$—, —CH═CHCH$_2$CH$_2$—, —CH$_2$CH$_2$CH═CH—, —CH$_2$O—, —OCH$_2$—, —CF$_2$O—, —OCF$_2$—, —COO—, —OCO—, —C$_2$F$_4$—, —CHFCF$_2$—, —CF═CF—, —CH═CF—, —CF═CH—, or —CH$_2$—.

8. An electro-optical display having active-matrix addressing based on the ECB, PA LCD, FFS or the IPS effect, which contains, as dielectric, a liquid-crystalline medium according to claim 1.

9. A liquid-crystalline medium according to claim 1, which further comprises in total four compounds of formulae

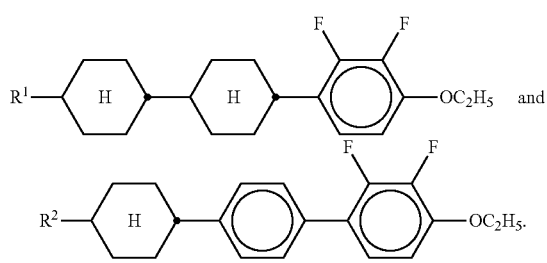 and

10. A liquid-crystalline medium according to claim 1, which further comprises at least one compound of formula IIIa and/or IIIb and at least one compound of formula IIIe

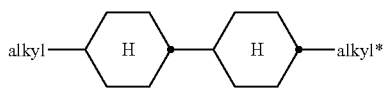 IIIa

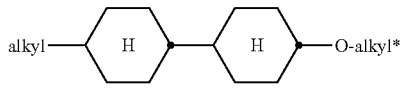 IIIb

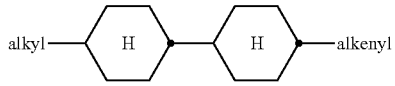 IIIe in which alkyl and alkyl* each, independently of one another, denote a straight-chain alkyl radical having 1-6 C atoms, and alkenyl denotes a straight-chain alkenyl radical having 2-6 C atoms.

11. A liquid-crystalline medium according to claim 7, which comprises one or more compounds of formulae IIIa to IIIj:

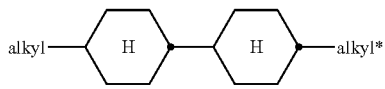 IIIa

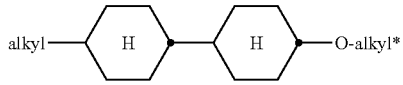 IIIb

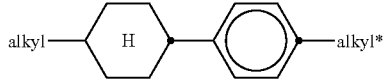 IIIc

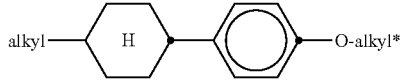 IIId

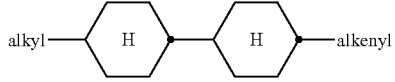 IIIe

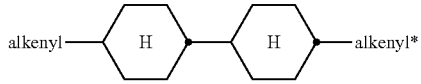 IIIf

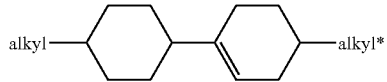 IIIg

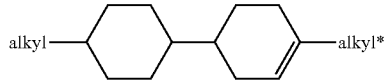 IIIh

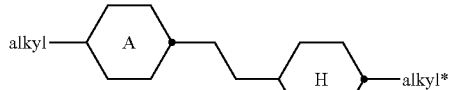 IIIi

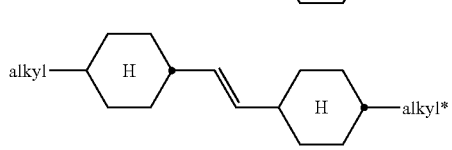 IIIj in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

12. A liquid-crystalline medium according to claim 7, which comprises one or more compounds of the following formulae

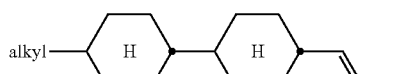

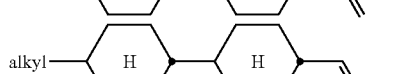

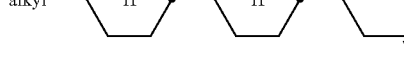

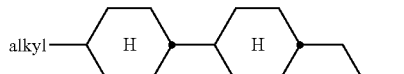

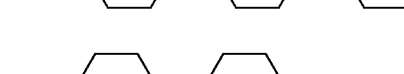

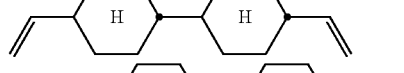

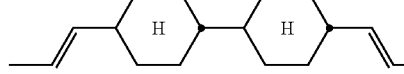

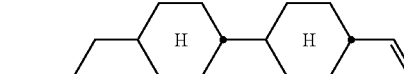

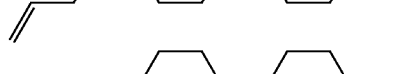

-continued

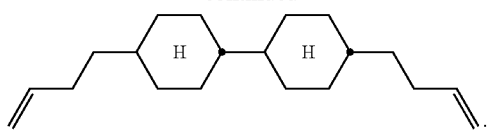

13. A liquid-crystalline medium according to claim 7, which comprises at least three compounds of the following formulae

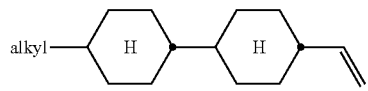
IIIe-1

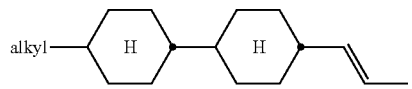
IIIe-2

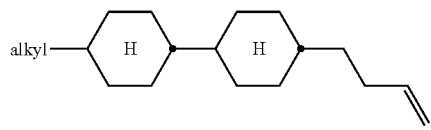
IIIe-3 wherein alkyl denotes $C_nH_{2n+1}$, where n=3, 4 or 5.

14. A liquid-crystalline medium according to claim 1, which further comprises a compound of formula IA

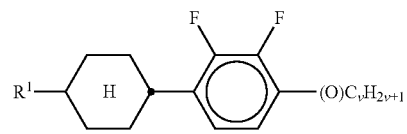
IA and/or comprises a compound of formula IB

IB in which
$R^1$ is a straight-chain alkenyl or alkyl, and
v denotes 1 to 6.

15. A liquid-crystalline medium according to claim 14, wherein when $R^1$ denotes alkenyl, said group is $CH_2=CH$, $CH_3-CH=CH$, $C_3H_7-CH=CH$, $CH_2=CH-C_2H_4$ or $CH_3-CH=CH-C_2H_4$.

16. A liquid-crystalline medium according to claim 6, which comprises
10-40% by weight of one or more compounds of the formulae IA and IB, and
10-40% by weight of one or more compounds of the formula II.

17. A liquid-crystalline medium according to claim 1, which further comprises one or more compounds of the following formulae, which compounds when present are each in an amount of at least 5% by weight

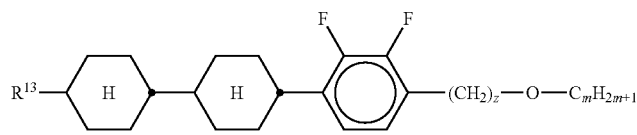

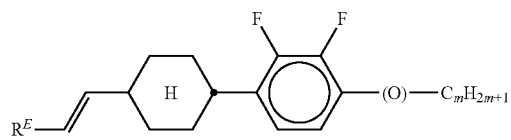

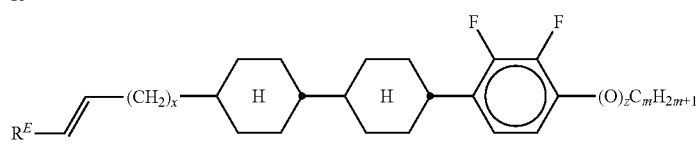

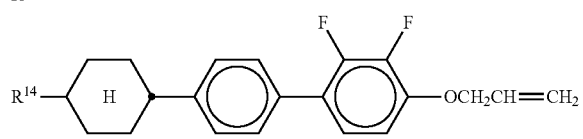
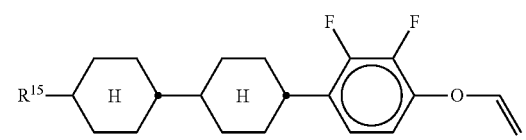

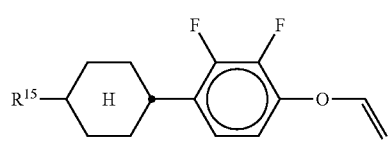
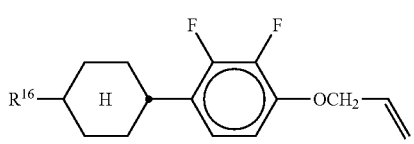

-continued

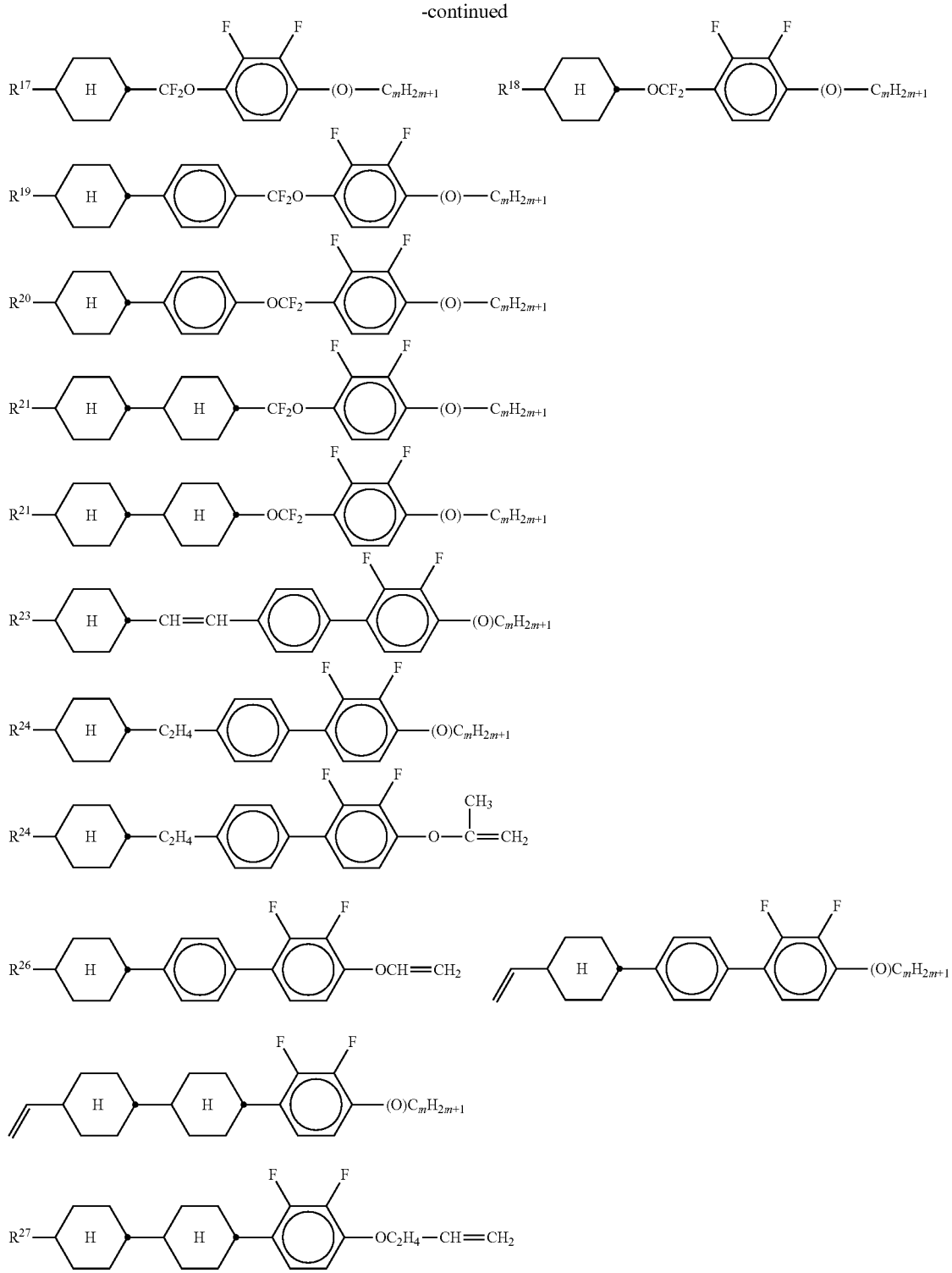

in which
R$^{13}$-R$^{27}$ each, independently of one another, denote H, an alkyl or alkenyl radical having up to 15 C atoms which is unsubstituted, monosubstituted by CN or CF$_3$ or at least monosubstituted by halogen, in which one or more CH$_2$ groups are optionally replaced by —O—, —S—,

—C≡C—, —OCF$_2$—, —CF$_2$O—, —OC—O— or —O—CO— in such a way that 0 atoms are not linked directly to one another, z and m each, independently of one another, denote 1-6,
$R^E$ denotes H, $CH_3$, $C_2H_5$ or n-$C_3H_7$, and
x denotes 0, 1, 2 or 3.
18. A liquid-crystalline medium according to claim 1, which further comprises one or more compounds of the following formulae T-1 to T-22
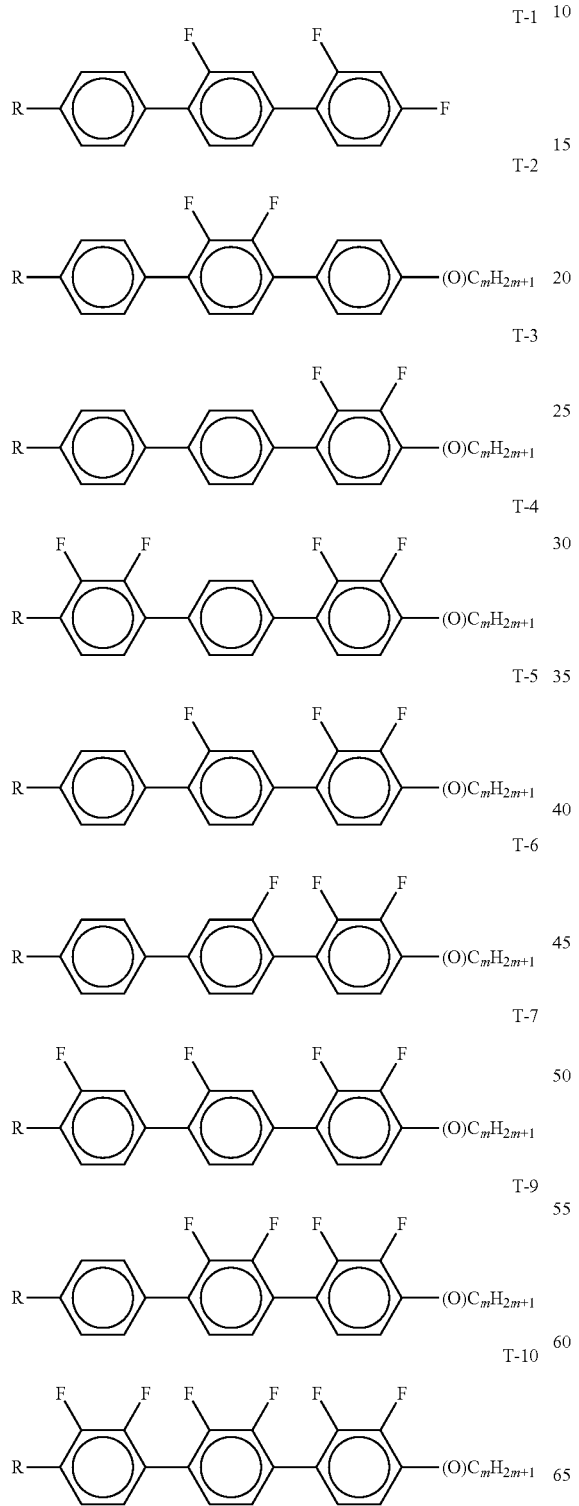
T-1
T-2
T-3
T-4
T-5
T-6
T-7
T-9
T-10
-continued
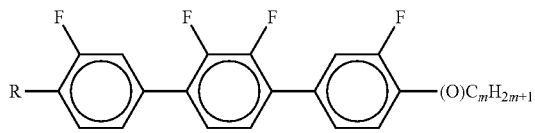
T-11
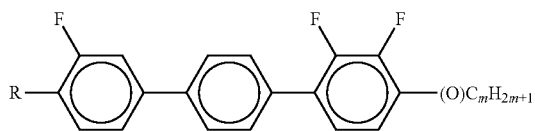
T-12
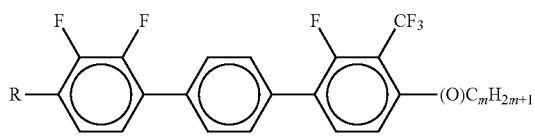
T-13
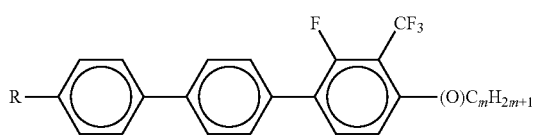
T-14
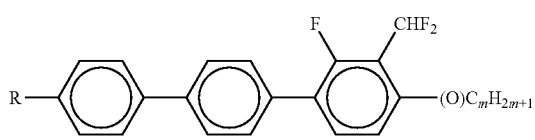
T-15
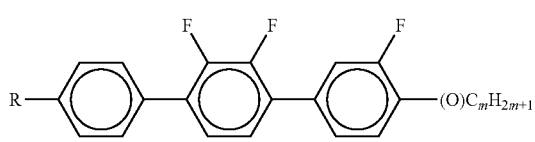
T-16
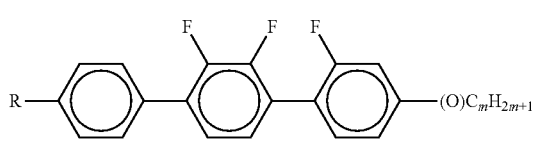
T-17
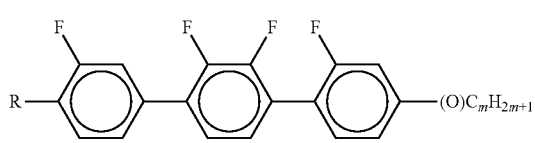
T-18
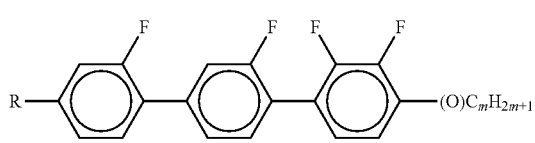
T-19
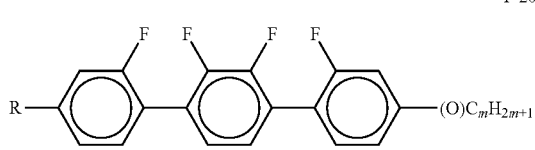
T-20

-continued

T-21
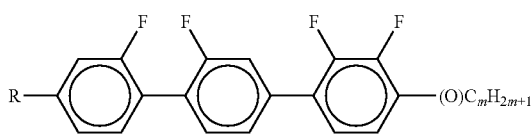

T-22
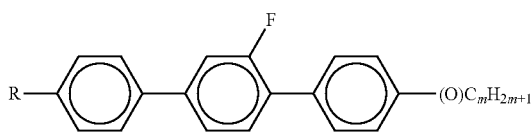

in which

R denotes H, an alkyl or alkenyl radical having up to 15 C atoms which is unsubstituted, monosubstituted by CN or $CF_3$ or at least monosubstituted by halogen, in which one or more $CH_2$ groups are optionally replaced by —O—, —S—,

—C≡C—, —$OCF_2$—, —$CF_2O$—, —OC—O— or —O—CO— in such a way that O atoms are not linked directly to one another.

19. A liquid-crystalline medium according to claim 1, which further comprises one or more compounds of the following formula

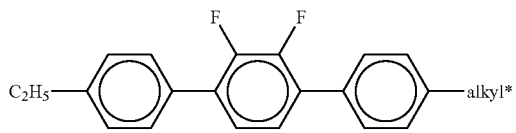

alkyl* denotes a straight-chain alkyl radical having 1-6 C atoms.

20. A liquid-crystalline medium according to claim 1, which comprises at least one compound of the formulae

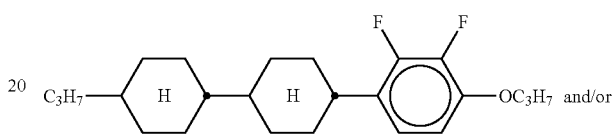 and/or

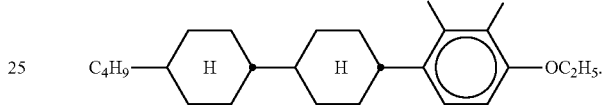

21. A liquid-crystalline medium according to claim 1, which further comprises one or more compounds of the following formulae

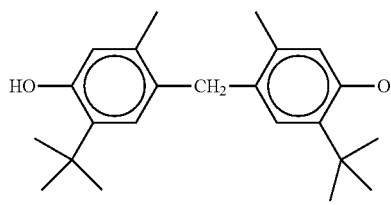 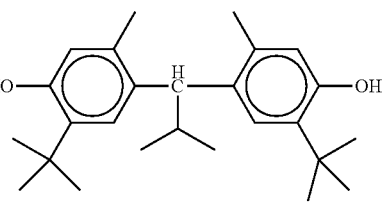

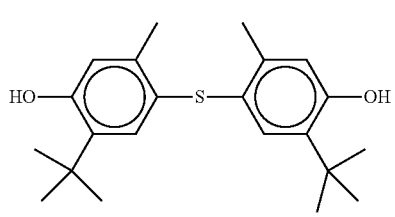 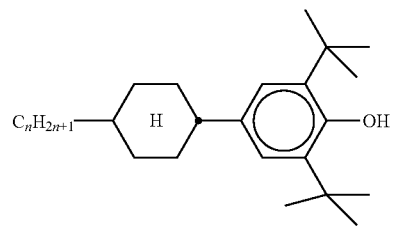 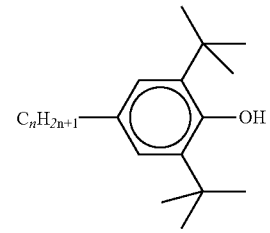

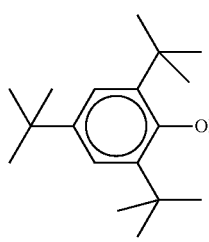 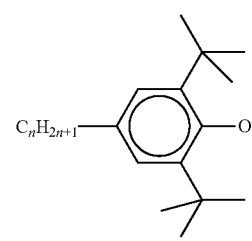 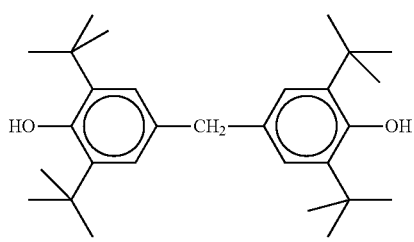

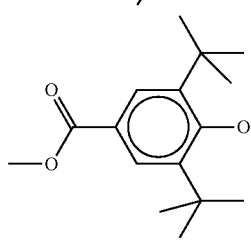 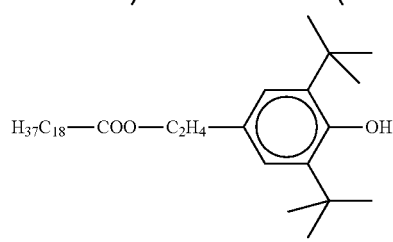 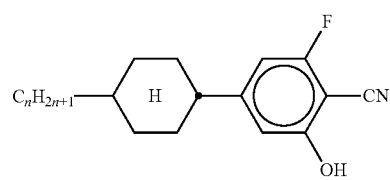

-continued
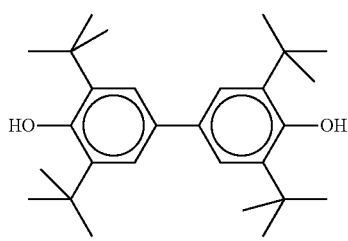
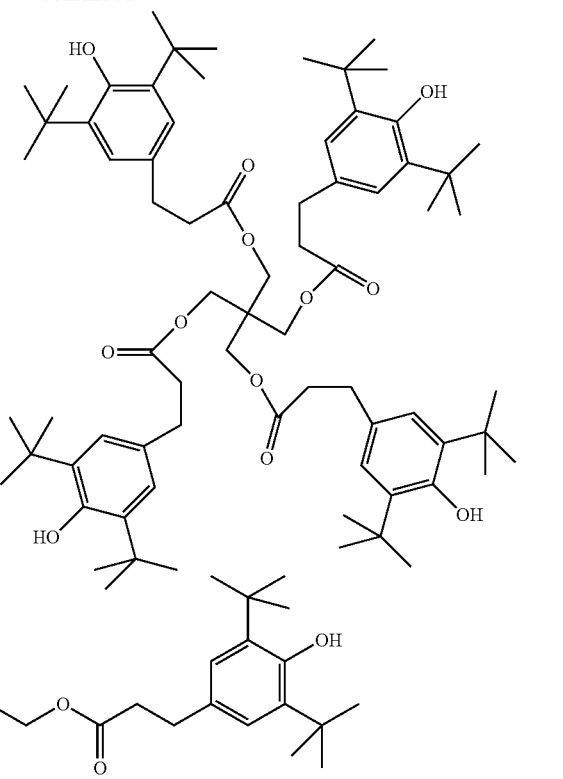
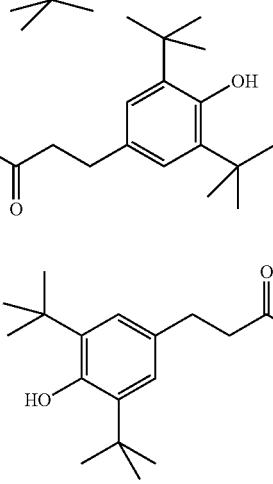
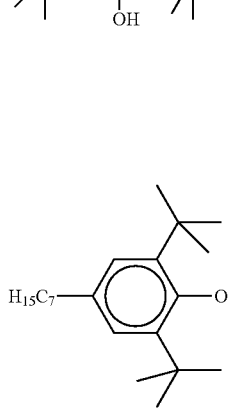
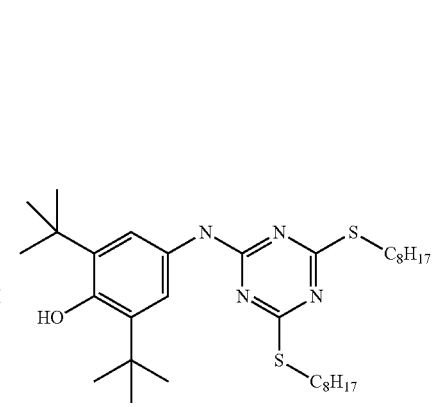
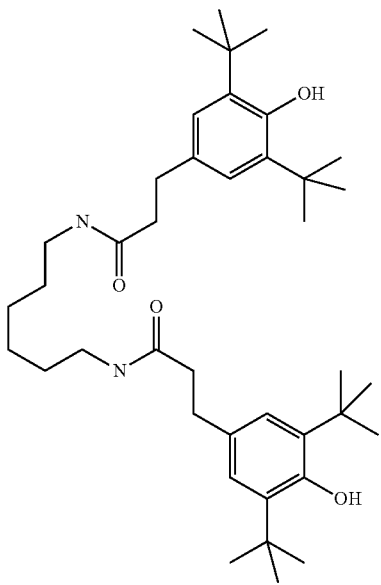

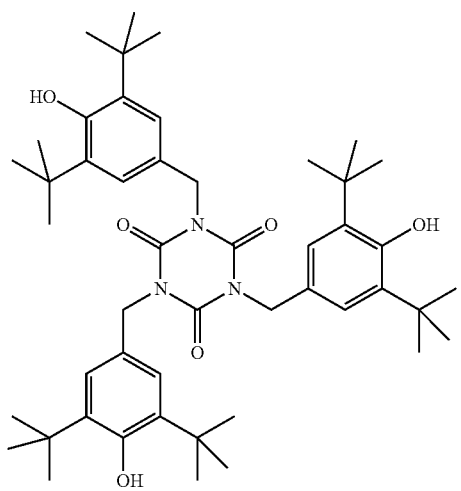
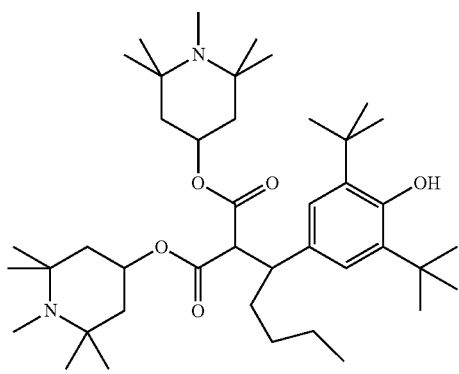
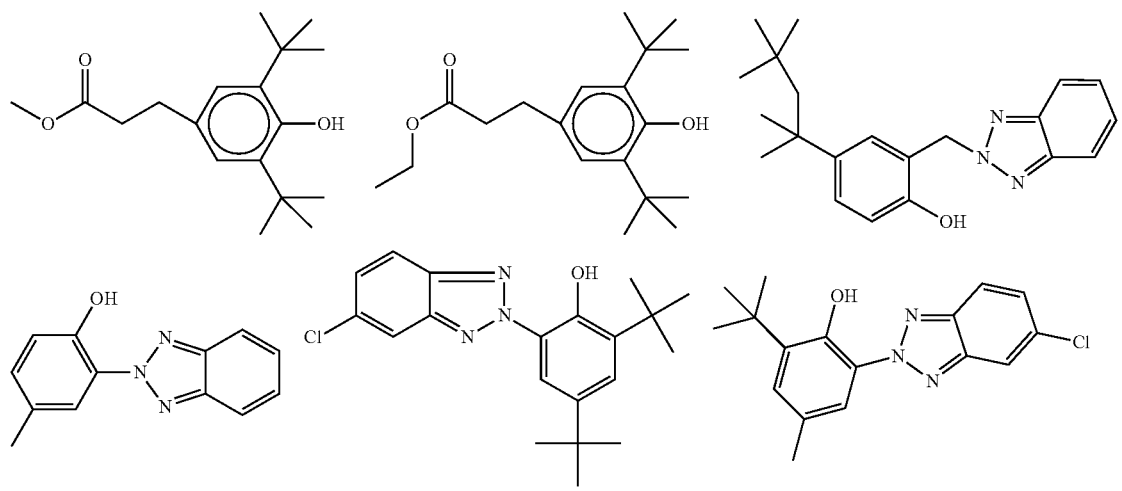
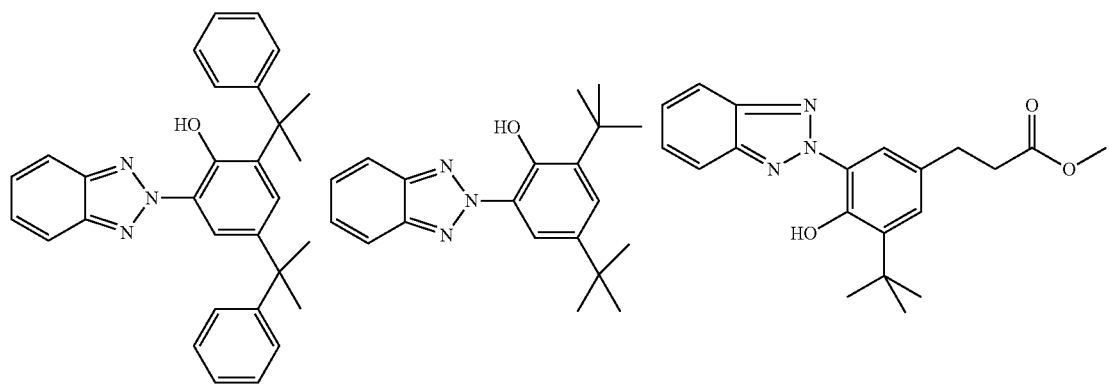
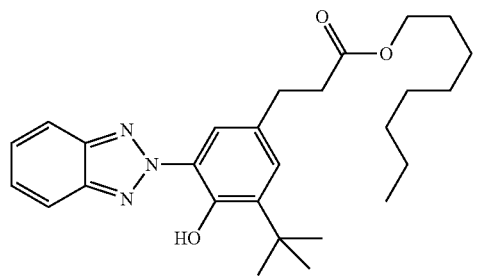

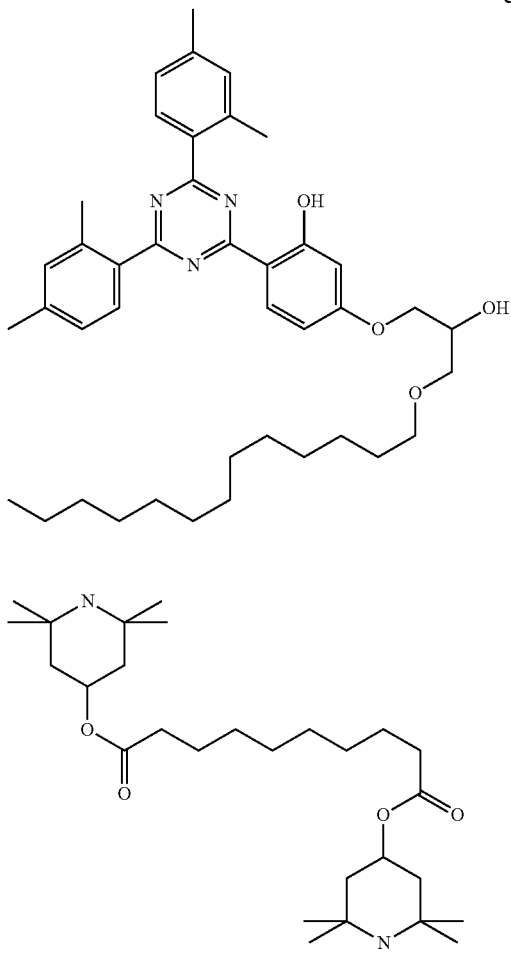

wherein n=1-12.

22. A liquid-crystalline medium according to claim 1, which comprises the following compound

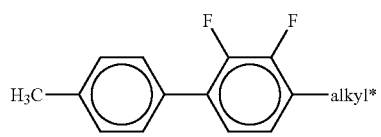

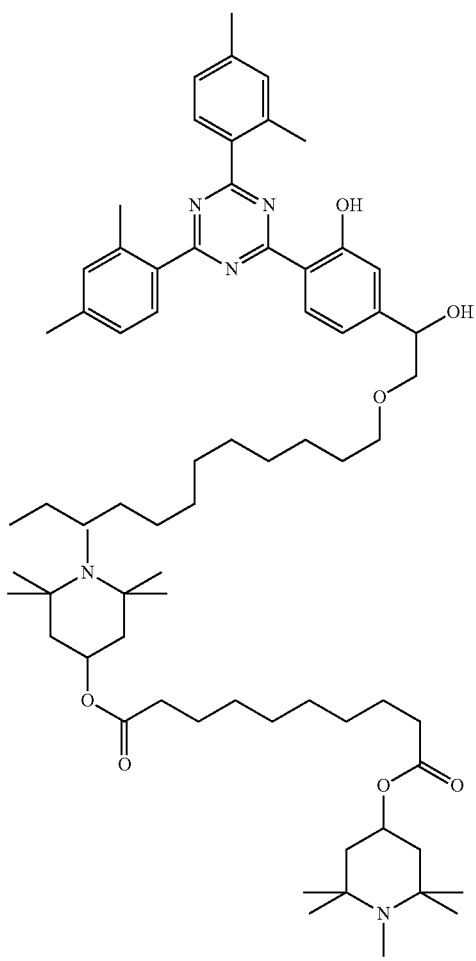

wherein alkyl* denotes a straight-chain alkyl radical having 1-6 C atoms.

23. A liquid-crystalline medium according to claim 1, wherein
alkenyl and alkenyl* each, independently of one another, denote vinyl, 1E-alkenyl or 3E-alkenyl.

24. A liquid-crystalline medium according to claim 1, wherein
$R^1$ and $R^2$ denote straight-chain alkyl or straight-chain alkenyl.

* * * * *